(12) United States Patent
Zhu

(10) Patent No.: US 11,324,072 B2
(45) Date of Patent: May 3, 2022

(54) MESSAGE TRANSMISSION METHOD AND APPARATUS

(71) Applicant: Huawei Technologies Co., Ltd., Shenzhen (CN)

(72) Inventor: Fenqin Zhu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 43 days.

(21) Appl. No.: 17/038,675

(22) Filed: Sep. 30, 2020

(65) Prior Publication Data

US 2021/0029775 A1 Jan. 28, 2021

Related U.S. Application Data

(63) Continuation of application No. PCT/CN2019/081691, filed on Apr. 8, 2019.

(30) Foreign Application Priority Data

Apr. 9, 2018 (CN) .......................... 201810313163.3

(51) Int. Cl.
*H04W 76/38* (2018.01)
*H04W 76/40* (2018.01)
(Continued)

(52) U.S. Cl.
CPC ............. *H04W 76/38* (2018.02); *H04W 4/06* (2013.01); *H04W 76/40* (2018.02); *H04W 88/18* (2013.01)

(58) Field of Classification Search
None
See application file for complete search history.

(56) References Cited

U.S. PATENT DOCUMENTS 7,499,455 B2 3/2009 Lee et al.
10,419,950 B2 9/2019 Wu
(Continued)

FOREIGN PATENT DOCUMENTS

CN 1922803 A 2/2007
CN 1988717 A 6/2007
(Continued)

OTHER PUBLICATIONS

3GPP TS 23.682, V15.4.0,"3rd Generation Partnership Project; Technical Specification Group Services and System Aspects; Architecture enhancements to facilitate communications with packet data networks and applications (Release 15)", Mar. 27, 2018 (Mar. 27, 2018), pp. 1-124.
(Continued)

*Primary Examiner* — Kenny S Lin
(74) *Attorney, Agent, or Firm* — Slater Matsil, LLP

(57) ABSTRACT

This application provides a message transmission method and apparatus. The method includes: receiving, by a service capability exposure function entity, first time information provided by a server, where the first time information is used to indicate a group message delivery stop time; determining, by the service capability exposure function entity, a bearer release time based on the first time information, and sending the bearer release time to a broadcast/multicast service center; or sending, by the service capability exposure function entity, a session termination request to the broadcast/multicast service center based on the first time information.

20 Claims, 13 Drawing Sheets

(51) Int. Cl.
*H04W 4/06* (2009.01)
*H04W 88/18* (2009.01)

(56) References Cited

U.S. PATENT DOCUMENTS

| | | | |
|---|---|---|---|
| 10,542,415 | B2 | 1/2020 | Hou et al. |
| 2016/0135143 | A1 | 5/2016 | Won et al. |
| 2016/0261998 | A1* | 9/2016 | Sharma ............... H04L 12/1425 |
| 2017/0264444 | A1 | 9/2017 | Li et al. |
| 2018/0054765 | A1 | 2/2018 | Kim et al. |
| 2018/0054799 | A1 | 2/2018 | Starsinic et al. |
| 2018/0123812 | A1* | 5/2018 | Hu ....................... H04L 12/185 |

FOREIGN PATENT DOCUMENTS

| | | | |
|---|---|---|---|
| CN | 102025714 | A | 4/2011 |
| CN | 102668493 | A | 9/2012 |
| CN | 105163285 | A | 12/2015 |
| CN | 105744500 | A | 7/2016 |
| CN | 106792563 | A | 5/2017 |
| CN | 107087442 | A | 8/2017 |
| CN | 107371139 | A | 11/2017 |
| CN | 107438996 | A | 12/2017 |
| CN | 107548550 | A | 1/2018 |
| CN | 107734606 | A | 2/2018 |
| CN | 107889063 | A | 4/2018 |
| EP | 1353523 | A1 * | 10/2003 ........ H04W 72/005 |
| WO | 2011157090 | A1 | 12/2011 |
| WO | 2016127612 | A1 | 8/2016 |

OTHER PUBLICATIONS

3GPP TS 23.501 V15.1.0 (Mar. 2018), 3rd Generation Partnership Project; Technical Specification Group Services and System Aspects; System Architecture for the 5G System; Stage 2 (Release 15), 201 pages.

3GPP TS 26.346, V15.0.0, "3rd Generation Partnership Project; Technical Specification Group Services and System Aspects; Multimedia Broadcast/Multicast Service (MBMS); Protocols and codecs (Release 15)", Jan. 9, 2018 (Jan. 9, 2018), pp. 1-279.

Zhaoyu, "Design of Transmission Network Optimization Scheme Based on Mobile Network", Jilin University, Dec. 8, 2012, with an English abstract, 54 pages.

Kunz, A. et al., "Enhanced 3GPP system for Machine Type Communications and Internet of Things", Oct. 28-30, 2015, IEEE Conference on Standards for Communications and Networking (CSCN), 8 pages.

* cited by examiner

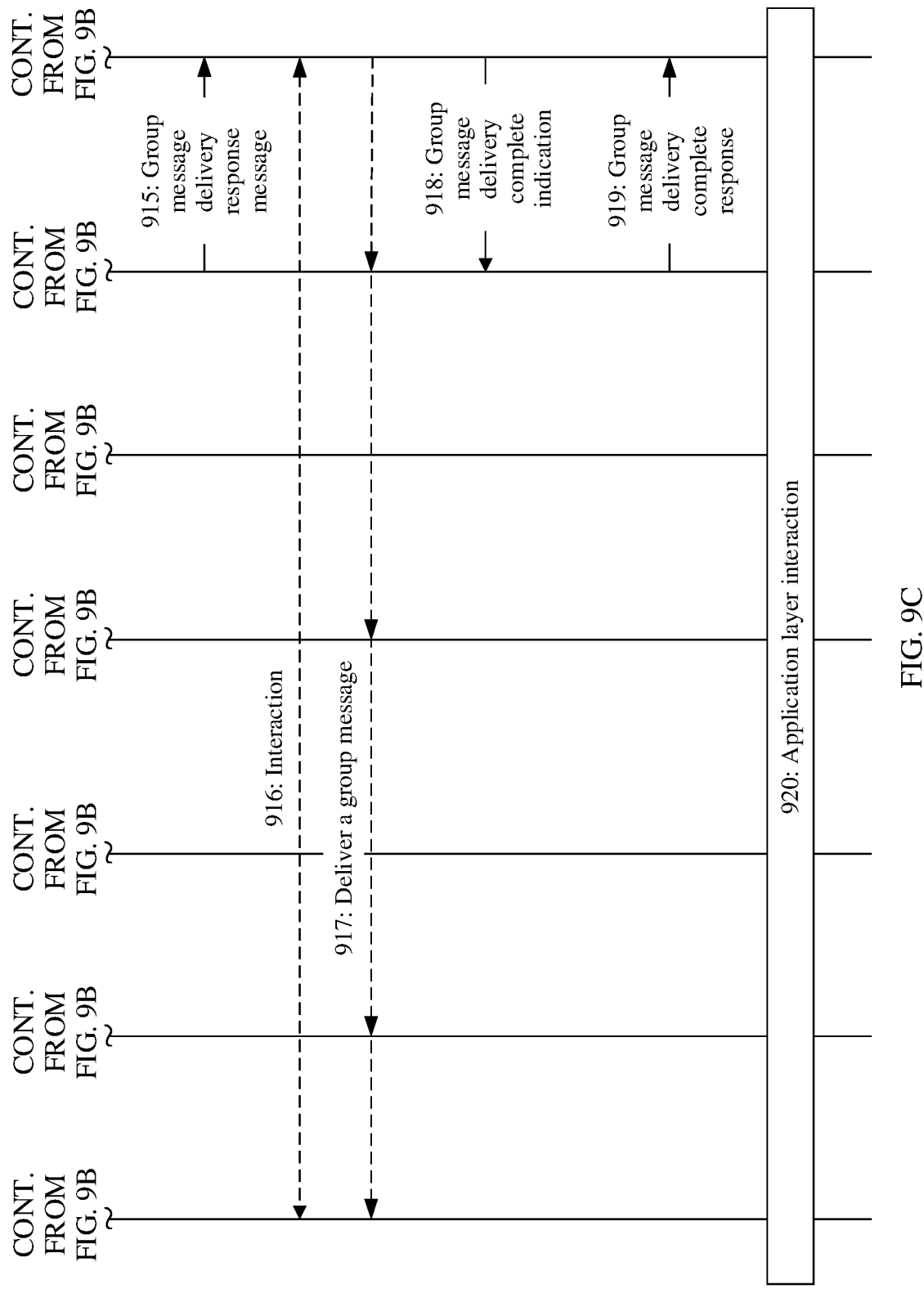

MESSAGE TRANSMISSION METHOD AND APPARATUS

CROSS-REFERENCE TO RELATED APPLICATIONS

This application is a continuation of International Application No. PCT/CN2019/081691, filed on Apr. 8, 2019, which claims priority to Chinese Patent Application No. 201810313163.3, filed on Apr. 9, 2018. The disclosures of the aforementioned applications are hereby incorporated by reference in their entireties.

TECHNICAL FIELD

This application relates to the communications field, and more specifically, to a message transmission method and apparatus.

BACKGROUND

In a service capability exposure architecture, a service capability server (SCS)/application server (AS) delivers a group message to a group of users by using a multimedia broadcast/multicast service (MBMS) user service provided by a network. A service capability exposure function (SCEF) is a core network element in the architecture, so that a 3GPP network can securely provide a service and a capability for the third-party service provider SCS/AS.

In the prior art, when the SCS/AS delivers a group message, the SCS/AS cannot ensure that the group message is completely delivered before an MBMS bearer is released.

SUMMARY

This application provides a message transmission method and apparatus. A group message delivery stop time is introduced, to help ensure that a server completes delivering a group message before the group message delivery stop time.

According to a first aspect, a message transmission method is provided, including: receiving, by a service capability exposure function entity, first time information provided by a server, where the first time information is used to indicate a group message delivery stop time; determining, by the service capability exposure function entity, a bearer release time based on the first time information, and sending the bearer release time to a broadcast/multicast service center; or sending, by the service capability exposure function entity, a session termination request to the broadcast/multicast service based on the first time information.

Optionally, the bearer release time is the same as the group message delivery stop time, or the bearer release time is later than the group message delivery stop time.

The session termination request is used to request the broadcast/multicast service center to terminate an ongoing session, so that the broadcast/multicast service center can release a bearer.

In this embodiment of this application, the server sends the first time information to the service capability exposure function entity, and the first time information is used to indicate the group message delivery stop time. In this way, the service capability exposure function entity determines the bearer release time based on the group message delivery stop time, to ensure that the server completes delivering a group message before the group message delivery stop time.

In some possible implementations, the method further includes: if the service capability exposure function entity receives a first group message delivery complete indication from the server and completes delivering the group message, sending, by the service capability exposure function entity, a second group message delivery complete indication to the server. The first group message delivery complete indication is used to indicate that the server has completed delivering the group message. The second group message delivery complete indication is used to indicate that the service capability exposure function entity has completed delivering the group message.

Therefore, after receiving the first group message delivery complete indication from the server and completing the group message delivery, the service capability exposure function entity sends the second group message delivery complete indication to the server, to notify the server that the service capability exposure function entity has completed delivering the group message.

In some possible implementations, the method further includes: receiving, by the service capability exposure function entity, second time information from the server, where the second time information includes a preset time period; and if the service capability exposure function entity does not receive, within the preset time period, data sent by the server, sending, by the service capability exposure function entity, the second group message delivery complete indication to the server.

Therefore, based on the second time information, if the service capability exposure function entity does not detect, within the preset time period, user plane data sent by the server, the service capability exposure function entity may determine that delivering the group message stops.

In some possible implementations, the method further includes: receiving, by the service capability exposure function entity, an adjusted bearer release time sent by the broadcast/multicast service center; and determining, by the service capability exposure function entity, third time information based on the adjusted bearer release time, and sending the third time information to the server, where the third time information is used to indicate an adjusted group message delivery stop time.

Optionally, the adjusted group message delivery stop time is the same as the adjusted bearer release time, or the adjusted group message delivery stop time is earlier than the adjusted bearer release time.

Therefore, the service capability exposure function entity may adjust the group message delivery stop time based on the adjusted bearer release time, to help ensure that the server completes delivering the group message before the bearer release time.

In some possible implementations, the receiving, by a service capability exposure function entity, first time information provided by a server, specifically includes: receiving, by the service capability exposure function entity, the first time information that is sent by the server by using a group message delivery request or a group message delivery modification request.

Herein, the group message delivery modification request may be understood as a modification performed by the server on the first time information. In other words, the server may modify the group message delivery stop time.

Therefore, the service capability exposure function entity may obtain the first time information by receiving the group message delivery request or a group message delivery modification request sent by the server.

In some possible implementations, after the service capability exposure function entity sends a session creation request to the broadcast/multicast service center, the sending, by the service capability exposure function entity, a session termination request to the broadcast/multicast service center based on the first time information includes: sending, by the service capability exposure function entity, the session termination request to the broadcast/multicast service center at or after the time indicated by the first time information.

Therefore, the service capability exposure function entity may send the session termination request to the broadcast/multicast service center to release the bearer.

According to a second aspect, a message transmission method is provided, including: sending, by a server, first time information to a service capability exposure function entity, where the first time information is used to indicate a group message delivery stop time; and delivering, by the server, a group message before the group message delivery stop time.

In this embodiment of this application, the server sends the first time information to a capability exposure function entity, to notify the capability exposure function entity of the group message delivery stop time, and delivers the group message before the group message delivery stop time. This helps ensure that the server completes delivering the group message before the group message delivery stop time.

In some possible implementations, the method further includes: sending, by the server, a first group message delivery complete indication to the service capability exposure function entity, where the first group message delivery complete indication is used to indicate that the server has completed delivering the group message.

Therefore, the server sends a group message delivery complete indication to the service capability exposure function entity, to notify the service capability exposure function entity that the server has completed delivering the group message.

In some possible implementations, the method further includes: sending, by the server, second time information to the service capability exposure function entity, where the second time information includes a preset time period, and the preset time period is used to determine, when the service capability exposure function entity does not receive, within the preset time period, data sent by the server, that the server stops delivering the group message.

Therefore, the server sends the second time information to the service capability exposure function entity, to notify the service capability exposure function entity of the preset time period. In this way, if the service capability exposure function entity does not detect, within the preset time period, user plane data sent by the server, the service capability exposure function entity may determine that delivering the group message stops.

In some possible implementations, the method further includes: receiving, by the server, a second group message delivery complete indication sent by the service capability exposure function entity. The second group message delivery complete indication is used to indicate that the service capability exposure function entity has completed delivering the group message.

Therefore, the server may learn, by receiving the second group message delivery complete indication, that the service capability exposure function entity has completed delivering the group message.

In some possible implementations, the method further includes: receiving, by the server, third time information from the service capability exposure function entity, where the third time information is used to indicate an adjusted group message delivery stop time; and the delivering, by the server, a group message before the group message delivery stop time includes: delivering, by the server, the group message before the adjusted group message delivery stop time.

Therefore, by receiving the adjusted group message delivery stop time sent by the service capability exposure function entity, the server may deliver the group message based on the adjusted group message delivery stop time, to ensure that the group message is completely delivered before the adjusted group message delivery stop time.

In some possible implementations, the sending, by a server, first time information to a service capability exposure function entity includes: sending, by the server, the first time information to the service capability exposure function entity by using a group message delivery request or a group message delivery modification request.

Herein, the group message delivery modification request may be understood as a modification performed by the server on the first time information. In other words, the server may modify the group message delivery stop time.

Therefore, the server notifies the service capability exposure function entity of the group message delivery stop time in the foregoing manners.

According to a third aspect, a message transmission method is provided, including: receiving, by a broadcast/multicast service center, a bearer release time sent by a service capability exposure function entity; and releasing, by the broadcast/multicast service center, a bearer based on the bearer release time.

In this embodiment of this application, the broadcast/multicast service center receives the bearer release time sent by the service capability exposure function entity, to release the bearer based on the bearer release time. In this way, it is ensured that the server completes delivering a group message before the bearer release time.

Optionally, the bearer may be an MBMS bearer.

Optionally, the bearer release time is the same as the group message delivery stop time, or the bearer release time is later than the group message delivery stop time.

In some possible implementations, the method further includes: adjusting, by the broadcast/multicast service center, the bearer release time to obtain an adjusted bearer release time; and sending, by the broadcast/multicast service center, the adjusted bearer release time to the service capability exposure function entity.

Therefore, the broadcast/multicast service center may send the adjusted bearer release time to the service capability exposure function entity, so that the service capability exposure function entity may adjust the group message delivery stop time based on the adjusted bearer release time, to ensure that the server completes delivering the group message before the bearer release time.

In some possible implementations, the method further includes: receiving, by the broadcast/multicast service center, a session termination request sent by the service capability exposure function entity.

Therefore, the broadcast/multicast service center receives the session termination request, terminates an ongoing session based on the session termination request, and releases the bearer.

According to a fourth aspect, a message transmission method is provided, including: receiving, by a service capability exposure function entity, a bearer release time from a broadcast/multicast service center; determining, by the service capability exposure function entity, first time information based on the bearer release time, where the first time information is used to indicate a group message delivery stop time; and sending, by the service capability exposure function entity, the first time information to a server.

Optionally, the group message delivery stop time is the same as the bearer release time, or the group message delivery stop time is earlier than the bearer release time.

In this embodiment of this application, the service capability exposure function entity obtains the bearer release time provided by the broadcast/multicast service center, determines the group message delivery stop time based on the bearer release time, and notifies the server of the group message delivery stop time. In this way, the server delivers a group message before the group message delivery stop time, to ensure that the server completes delivering the group message before a bearer is released.

In some possible implementations, the method further includes: if the service capability exposure function entity receives a first group message delivery complete indication from the server and completes delivering the group message, sending, by the service capability exposure function entity, a second group message delivery complete indication to the server, where the first group message delivery complete indication is used to indicate that the server has completed delivering the group message, and the second group message delivery complete indication is used to indicate that the service capability exposure function entity has completed delivering the group message.

Therefore, after receiving the first group message delivery complete indication from the server and completing the group message delivery, the service capability exposure function entity sends the second group message delivery complete indication to the server, to notify the server that the service capability exposure function entity has completed delivering the group message.

In some possible implementations, the method further includes: receiving, by the service capability exposure function entity, second time information from the server, where the second time information includes a preset time period; and if the service capability exposure function entity does not receive, within the preset time period, data sent by the server, sending, by the service capability exposure function entity, the second group message delivery complete indication to the server.

Therefore, based on the second time information, if the service capability exposure function entity does not detect, within the preset time period, user plane data sent by the server, the service capability exposure function entity may determine that delivering the group message stops.

In some possible implementations, the method further includes: receiving, by the service capability exposure function entity, an adjustment instruction from the server, where the adjustment instruction is used to adjust the group message delivery stop time; obtaining, by the service capability exposure function entity, an adjusted bearer release time according to the adjustment instruction; determining, by the service capability exposure function entity, an adjusted group message delivery stop time based on the adjusted bearer release time, where the adjusted group message delivery stop time is the same as or earlier than the adjusted bearer release time; and sending, by the service capability exposure function entity, the adjusted group message delivery stop time to the server.

Therefore, the service capability exposure function entity receives the adjustment instruction sent by the server, and determines the adjusted group message delivery stop time according to the adjustment instruction.

According to a fifth aspect, a message transmission method is provided, including: receiving, by a server, first time information from a service capability exposure function entity, where the first time information is used to indicate a group message delivery stop time; and delivering, by the server, a group message before the group message delivery stop time.

In this embodiment of this application, the server receives the group message delivery stop time sent by the service capability exposure function entity, and delivers the group message based on the group message delivery stop time, to ensure that the server completes delivering the group message before the group message delivery stop time.

Optionally, a bearer release time is the same as the group message delivery stop time, or the bearer release time is later than the group message delivery stop time.

In some possible implementations, the method further includes: sending, by the server, second time information to the service capability exposure function entity, where the second time information includes a preset time period.

Therefore, the server sends the second time information to the service capability exposure function entity, to notify the service capability exposure function entity of the preset time period. In this way, if the service capability exposure function entity does not detect, within the preset time period, user plane data sent by the server, the service capability exposure function entity may determine that delivering the group message stops.

In some possible implementations, the method further includes: sending, by the server, a first group message delivery complete indication to the service capability exposure function entity. The first group message delivery complete indication indicates that the server has completed delivering the group message.

Therefore, the server sends a group message delivery complete indication to the service capability exposure function entity, to notify the service capability exposure function entity that the server has completed delivering the group message.

In some possible implementations, the method further includes: receiving, by the server, a second group message delivery complete indication sent by the service capability exposure function entity. The second group message delivery complete indication is used to indicate that the service capability exposure function entity has completed delivering the group message.

Therefore, the server may learn, by receiving the second group message delivery complete indication, that the service capability exposure function entity has completed delivering the group message.

In some possible implementations, the method further includes: sending, by the server, an adjustment instruction to the service capability exposure function entity, where the adjustment instruction is used to adjust the group delivery message stop time.

Therefore, the server may send the adjustment instruction to the service capability exposure function entity, to request a modification to the group delivery message stop time.

According to a sixth aspect, a message transmission apparatus is provided. The apparatus may be a service capability exposure function entity (for example, an SCEF), or may be a chip. The apparatus has a function of implementing the service capability exposure function entity in any aspect or any possible implementation of any aspect. The function may be implemented by hardware, or may be implemented by hardware executing corresponding software. The hardware or the software includes one or more modules corresponding to the function.

According to a seventh aspect, a message transmission apparatus is provided. The apparatus may be a server (for example, an SCS/AS), or may be a chip. The apparatus has a function of implementing the server in any aspect or any possible implementation of any aspect. The function may be implemented by hardware, or may be implemented by hardware executing corresponding software. The hardware or the software includes one or more modules corresponding to the function.

According to an eighth aspect, a message transmission apparatus is provided. The apparatus may be a broadcast/multicast service center (for example, a BM-SC), or may be a chip. The apparatus has a function of implementing the broadcast/multicast service center in any aspect or any possible implementation of any aspect. The function may be implemented by hardware, or may be implemented by hardware executing corresponding software. The hardware or the software includes one or more modules corresponding to the function.

According to a ninth aspect, an apparatus is provided. The apparatus includes a processor, a memory, and a transceiver. The processor is connected to the memory and the transceiver. The memory is configured to store an instruction; the processor is configured to execute the instruction; and the transceiver is configured to communicate with another network element under control of the processor. When the processor executes the instruction stored in the memory, the apparatus is enabled to perform the method of the service capability exposure function entity in any one of the foregoing aspects or any possible implementation of any one of the foregoing aspects. It should be noted that the memory may be integrated into the processor, or may be independent of the processor.

According to a tenth aspect, an apparatus is provided. The apparatus includes a processor, a memory, and a transceiver. The processor is connected to the memory and the transceiver. The memory is configured to store an instruction; the processor is configured to execute the instruction; and the transceiver is configured to communicate with another network element under control of the processor. When the processor executes the instruction stored in the memory, the apparatus is enabled to perform the method of the server in any one of the foregoing aspects or any possible implementation of any one of the foregoing aspects. It should be noted that the memory may be integrated into the processor, or may be independent of the processor.

According to an eleventh aspect, an apparatus is provided. The apparatus includes a processor, a memory, and a transceiver. The processor is connected to the memory and the transceiver. The memory is configured to store an instruction; the processor is configured to execute the instruction; and the transceiver is configured to communicate with another network element under control of the processor. When the processor executes the instruction stored in the memory, the apparatus is enabled to perform the method of the broadcast/multicast service center in any one of the foregoing aspects or any possible implementation of any one of the foregoing aspects. It should be noted that the memory may be integrated into the processor, or may be independent of the processor.

According to a twelfth aspect, a computer-readable storage medium is provided. The computer-readable storage medium stores a program, and the program enables a service capability exposure function entity to perform the method of the service capability exposure function entity in any one of the foregoing aspects or any possible implementation of any one of the foregoing aspects.

According to a thirteenth aspect, a computer-readable storage medium is provided. The computer-readable storage medium stores a program, and the program enables a server to perform the method of the server in any one of the foregoing aspects or any possible implementation of any one of the foregoing aspects.

According to a fourteenth aspect, a computer-readable storage medium is provided. The computer-readable storage medium stores a program, and the program enables a broadcast/multicast service center to perform the method of the broadcast/multicast service center in any one of the foregoing aspects or any possible implementation of any one of the foregoing aspects.

According to a fifteenth aspect, a communications chip is provided. The communications chip stores an instruction. When the instruction is run on a computer device, the communications chip is enabled to perform the method in any possible implementation of any one of the foregoing aspects.

According to a sixteenth aspect, a computer program product including an instruction is provided. When the instruction is run on a computer, the computer is enabled to perform the method in any one of the foregoing aspects or any possible implementation of any one of the foregoing aspects.

According to a seventeenth aspect, a message transmission system is provided. The system includes a service capability exposure function entity, a server, and a broadcast/multicast service center.

The server is configured to send first time information to the service capability exposure function entity, where the first time information is used to indicate a group message delivery stop time; and deliver a group message before the group message delivery stop time.

The service capability exposure function entity is configured to determine a bearer release time based on the first time information, and send the bearer release time to a broadcast/multicast service center; or send a session termination request to the broadcast/multicast service center based on the first time information.

The broadcast/multicast service center is configured to receive the bearer release time sent by the service capability exposure function entity; and release a bearer based on the bearer release time.

In a possible implementation, the service capability exposure function entity may be the service capability exposure function entity in the first aspect. Correspondingly, the server may be the server in the second aspect, and the broadcast/multicast service center may be the broadcast/multicast service center in the third aspect.

Optionally, the system may also include another network element, for example, UE, a RAN, or an SMF, that communicates with the service capability exposure function entity, the server, or the broadcast/multicast service center.

According to an eighteenth aspect, a message transmission system is provided. The system includes a service capability exposure function entity, a server, and a broadcast/multicast service center.

The server is configured to receive first time information from the service capability exposure function entity, where the first time information is used to indicate a group message delivery stop time; and deliver a group message before the group message delivery stop time.

The service capability exposure function entity is configured to receive a bearer release time from the broadcast/multicast service center; determine the first time information based on the bearer release time, where the first time information is used to indicate the group message delivery stop time; and send the first time information to the server.

The broadcast/multicast service center is configured to send the bearer release time to the service capability exposure function entity; and release a bearer based on the bearer release time.

In a possible implementation, the service capability exposure function entity may be the service capability exposure function entity in the fourth aspect. Correspondingly, the server may be the server in the fifth aspect, and the broadcast/multicast service center may be the broadcast/multicast service center in the third aspect.

Optionally, the system may also include another network element, for example, UE, a RAN, or an SMF, that communicates with the service capability exposure function entity, the server, or the broadcast/multicast service center.

BRIEF DESCRIPTION OF THE DRAWINGS

FIG. 9A, FIG. 9B, and FIG. 9C are a schematic flowchart of an example of a message transmission method according to another embodiment of this application;

DETAILED DESCRIPTION OF ILLUSTRATIVE EMBODIMENTS

The following describes technical solutions of this application with reference to accompanying drawings.

The technical solutions of the embodiments of this application may be applied to various communications systems, such as a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunication system (UMTS), a worldwide interoperability for microwave access (WiMAX) communications system, a future 5th generation (5G) system, another future system or new radio (NR), an internet of vehicles system of vehicle-to-everything (V2X) communication, and the like.

It should be understood that sequence numbers of processes do not mean execution sequences in various embodiments of this application. The execution sequences of the processes should be determined based on functions and internal logic of the processes, and should not be construed as any limitation on the implementation processes of the embodiments of this application.

Figure 1:
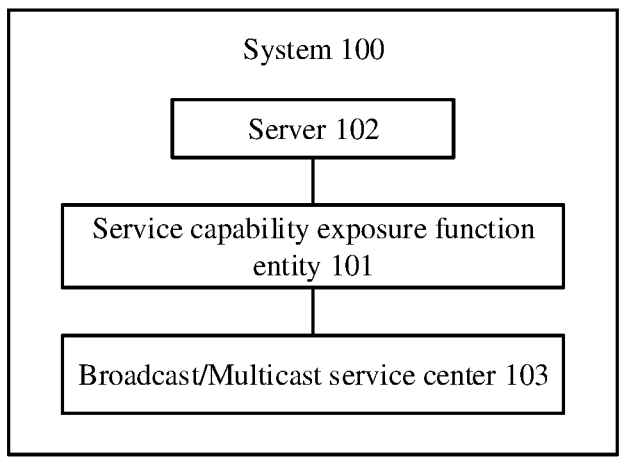
FIG. 1 is a schematic diagram of a system architecture that is applied to an embodiment of this application.

FIG. 1 is a schematic diagram of a system architecture that is applied to an embodiment of this application. As shown in FIG. 1, a system 100 includes: a service capability exposure function entity 101, a server 102, and a broadcast/multicast service center 103. The system 100 may be configured to perform a message transmission method in the embodiments of this application.

In a possible implementation, the service capability exposure function entity 101 is configured to: receive first time information provided by the server 102, where the first time information is used to indicate a group message delivery stop time; determine a bearer release time based on the first time information, and send the bearer release time to the broadcast/multicast service center 103; or send a session termination request to the broadcast/multicast service center 103 based on the first time information.

Optionally, the bearer release time is the same as the group message delivery stop time, or the bearer release time is later than the group message delivery stop time.

The server 102 is configured to send the first time information to the service capability exposure function entity 101, where the first time information is used to indicate the group message delivery stop time; and deliver a group message before the group message delivery stop time.

The broadcast/multicast service center 103 is configured to receive the bearer release time from the service capability exposure function entity, and release a bearer based on the bearer release time.

In another possible implementation, the service capability exposure function entity 101 is configured to receive the bearer release time from the broadcast/multicast service center 1o3; determine the first time information based on the bearer release time, where the first time information is used to indicate the group message delivery stop time; and send the first time information to the server 102.

The server 102 is configured to receive the first time information from the service capability exposure function entity 101, where the first time information is used to indicate the group message delivery stop time; and deliver the group message before the group message delivery stop time.

It should be noted that the service capability exposure function entity 101, the server 102, the broadcast/multicast service center 103, and the like in FIG. 1 are merely names, and the names do not constitute a limitation on a network element or a device. In a 5G network and another future network (for example, a 6G network), devices or entities corresponding to the service capability exposure function entity 101, the server 102, and the broadcast/multicast service center 103 may have other names. This is not specifically limited in this embodiment of this application.

It may be understood that the foregoing functions may be network elements on a hardware device, or may be software functions allowed on dedicated hardware, or may be virtualization functions instantiated on a platform (for example, a cloud platform).

Optionally, the system in FIG. 1 may also include a terminal. The terminal in this embodiment of this application may be referred to as user equipment (UE), an access terminal, a terminal in V2X communication, a subscriber unit, a subscriber station, a mobile station, a mobile console, a remote station, a remote terminal, a mobile device, a user terminal, a terminal device, a wireless communications device, a user agent, a user apparatus, or the like. The terminal may alternatively be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in the future 5G network, or a terminal device in a future evolved public land mobile network (PLMN). This is not limited in this embodiment of this application. The terminal may further include a V2X device, for example, an on-board unit (OBU) in the vehicle.

The terminal in this embodiment of this application is connected to a radio access network RAN device in a wireless manner. The radio access network device is connected to a core network device in a wireless or wired manner. The core network device and the radio access network device may be different physical devices that are independent of each other, or a function of the core network device and a logical function of the radio access network device may be integrated into a same physical device, or some functions of the core network device and some functions of the radio access network device may be integrated into one physical device. The terminal may be at a specified location, or may be mobile.

The radio access network device is an access device used by the terminal to access the mobile communications system in a wireless manner, and may be a base station NodeB, an evolved base station eNodeB, a base station (gNodeB, gNB) in a 5G mobile communications system, a base station in a future mobile communications system, an access node in a wireless fidelity (WiFi) system, or the like. The radio access network may also be a radio controller in a cloud radio access network (CRAN) scenario. Alternatively, the access network device may be a relay station, an access point, a vehicle-mounted device, a wearable device, a network device in the future 5G network, a network device in the future evolved PLMN network, or the like. A specific technology and a specific device form that are used by the radio access network device are not limited in this embodiment of this application.

The core network device includes, for example, a mobility management entity (MME), a broadcast/multicast service center (BMSC), or may include a corresponding function entity in a 5G system, for example, a network function of a core network control plane (CP) or user plane (UP). For example, the network function may be a session management network function (SMF), an access and mobility management function (AMF), or the like. The core network control plane may also be understood as a core network control plane function (CPF) entity.

The V2X communication means that a vehicle may timely obtain road condition information or receive information by using vehicle-to-vehicle (V2V) communication, vehicle-to-infrastructure (V2I) communication, vehicle-to-pedestrian (V2P) communication, vehicle-to-network (V2N) communication, or another communication manner. The most common V2V and V2I are used as an example. The vehicle may broadcast, to a surrounding vehicle by using the V2V communication, information such as a speed of the vehicle, a driving direction, a specific location, or whether an emergency brake is stepped on, and the surrounding vehicle obtains the information. In this way, a driver may better perceive a traffic condition, to make a judgment in advance on a dangerous situation, and then make timely avoidance. Optionally, for the V2I communication, in addition to interaction of the security information, a roadside infrastructure may further provide various types of service information and data network access for the vehicle. Functions such as electronic toll collection and intra-vehicle entertainment greatly improve transportation intelligence. Generally, a network used for the V2X communication is referred to as internet of vehicles.

The radio access network device and the terminal may be deployed on land, including indoor or outdoor, or the radio access network device and the terminal may be handheld, or vehicle-mounted. The radio access network device and the terminal may also be deployed on water, or be deployed on an aircraft, a balloon or a satellite in the air. An application scenario of the radio access network device and the terminal is not limited in this embodiment of this application.

This embodiment of this application may be applied to downlink packet transmission, uplink packet transmission, and device-to-device (D2D) packet transmission. It should be uniformly noted herein that a packet may be data, or may be a signal. This is not limited. For the downlink packet transmission, a sending device is a radio access network device or a transit device (the transit device is configured to forward a downlink packet to the radio access network device, so that the radio access network device sends the downlink packet to a terminal), and a corresponding receiving device is the terminal. For the uplink packet transmission, the sending device is a terminal, and the corresponding receiving device may be a radio access network device or a transit device (the transit device is configured to forward an uplink packet to the radio access network device). For the D2D packet transmission, the sending device is a terminal, and the corresponding receiving device is also a terminal. A packet transmission direction is not limited in this embodiment of this application.

Communication between the radio access network device and the terminal and between the terminals may be performed by using a licensed spectrum, or an unlicensed spectrum, or both the licensed spectrum and the unlicensed spectrum. Communication between the radio access network device and the terminal and between the terminals may be performed by using a spectrum below 6 GHz (gigahertz), or a spectrum above 6 GHz, or both the spectrum below 6 GHz and the spectrum above 6 GHz. A spectrum resource used between the radio access network device and the terminal is not limited in this embodiment of this application.

Optionally, the system 100 shown in FIG. 1 may be applied to a 4G network, the 5G network, or the another possible future network. This is not specifically limited in this embodiment of this application.

Figure 2:
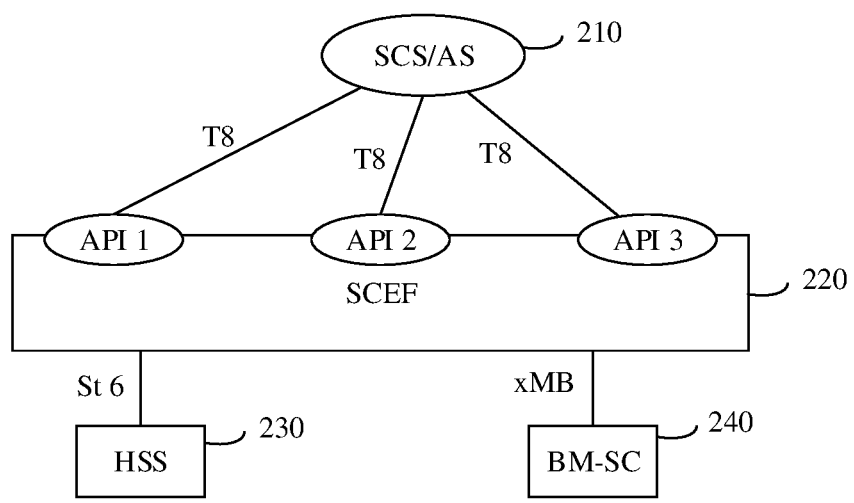
FIG. 2 is a diagram of a service capability exposure architecture in a 4G network that is applied to this application.

FIG. 2 is a diagram of a service capability exposure architecture in a 4G network that may be applied to this application. Based on the architecture, a 3GPP network can securely provide a service and a capability for a third-party service provider service capability server (SCS)/application server (AS). The architectural diagram includes an SCS/AS 210, a service capability exposure function (SCEF) 220, a home subscriber server (HSS) 230, and a broadcast/multicast service center (BM-SC) 240. Optionally, the architectural diagram may further include UE that is not shown in the figure.

Specifically, the SCEF network element 220 is a core network element in the architecture, so that the 3GPP network can securely provide the service and the capability for the third-party service provider SCS/AS. The HSS 230 is a home subscriber server, and stores subscription information of a subscriber. The SCS/AS 210 invokes, by using an application programming interface (API) of a T8, the service and the capability provided by the SCEF. The BM-SC provides a service and a capability supported by the BM-SC for the SCEF by using an xMB interface. The BM-SC 240 supports provision and delivery of an MBMS user service, and is configured to serve as an entry point for a content provider MBMS to perform transmission, to authorize and initiate an MBMS bearer service, and arrange and transmit MBMS data.

The system 100 shown in FIG. 1 is applied to the service capability exposure architecture in the 4G network shown in FIG. 2. As shown in FIG. 2, for example, the service capability exposure function entity 101 may be the SCEF 220 in the 4G network, the server 102 may be the SCS/AS 210 in the 4G network, and the broadcast/multicast service center 103 may be the BM-SC 240 in the 4G network.

It should be noted that names of the interfaces between various network elements in FIG. 2 are only examples, and the interfaces may have other names in a specific implementation. This is not specifically limited in this embodiment of this application.

It should be noted that names of the network elements (such as the SCEF, the SCS/AS, and the BM-SC) included in FIG. 2 are merely names, and the names do not constitute a limitation on the functions of the network elements. In a 4G or 5G network and another future network, the foregoing network elements may alternatively have other names. This is not specifically limited in this embodiment of this application. For example, in a 6G network, some or all of the foregoing network elements may still use terms in the 4G or 5G, or may use other names, or the like. This is uniformly described herein, and details are not described below again. It should be understood that the architectural diagram shown in FIG. 2 may further include other network elements, which are not shown one by one herein.

Figure 3:
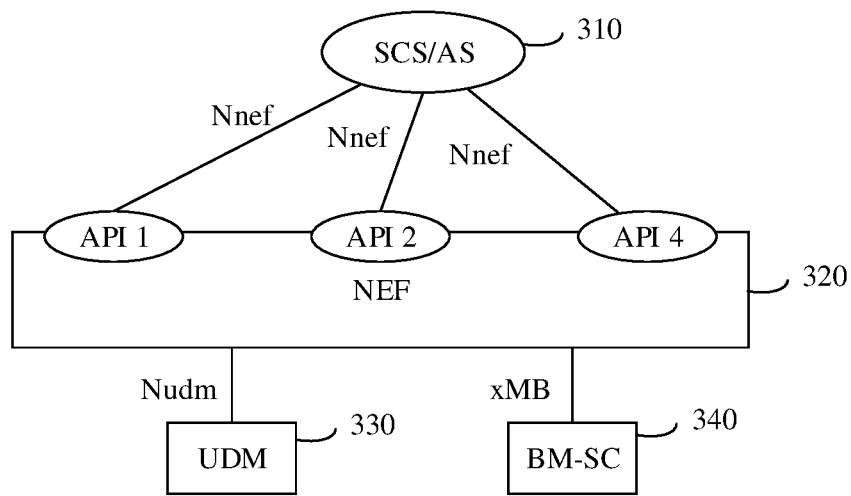
FIG. 3 is a diagram of a service capability exposure architecture in a 5G network that is applied to this application.

FIG. 3 is a diagram of a service capability exposure architecture in a 5G network that may be applied to this application. The architectural diagram shown in FIG. 3 includes an SCS/AS 310, a network exposure function (NEF) 320, a unified data management (UDM) 330, and a BM-SC 340. Optionally, the architectural diagram may further include UE, a session management function (SMF), a core network access and mobility management function (AMF), and the like that are not shown in the figure.

A 5G system is a service-based architecture. Therefore, an NEF (a function similar to the SCEF) network element develops, for an SCS/AS by using an Nnef service, a service and a capability supported by a 3GPP network. The UDM (a function similar to a mobility management function of an HSS) network element provides a service and a capability supported by the UDM for the NEF by using an Nudm service. The AMF (a function similar to an MME) network element provides a service and a capability supported by the AMF for the NEF by using an Namf service. The SMF (a function similar to a session management function of the MME) network element provides a service and a capability supported by the SMF for the NEF by using an Nsmf service. The BM-SC provides a service and a capability supported by the BM-SC for the NEF by using an xMB interface.

The system 100 shown in FIG. 1 is applied to the service-based architecture in the 5G network shown in FIG. 3. As shown in FIG. 3, for example, the service capability exposure function entity 101 may be the SCEF 320 in the 5G network, the server 102 may be the SCS/AS 310 in the 5G network, and the broadcast/multicast service center 103 may be the BM-SC 340 in the 5G network. It should be understood that the architectural diagram shown in FIG. 3 may further include other network elements, which are not shown one by one herein.

It should be noted that names of the interfaces between various network elements in FIG. 3 are only examples, and the interfaces may have other names in a specific implementation. This is not specifically limited in this embodiment of this application.

It should be noted that names of the network elements (such as the SCEF, the SCS/AS, and the BM-SC) included in FIG. 3 are merely names, and the names do not constitute a limitation on the functions of the network elements.

For specific working processes and beneficial effects of the network elements in the systems in FIG. 1 to FIG. 3, refer to descriptions in the following method embodiments.

Figure 4:
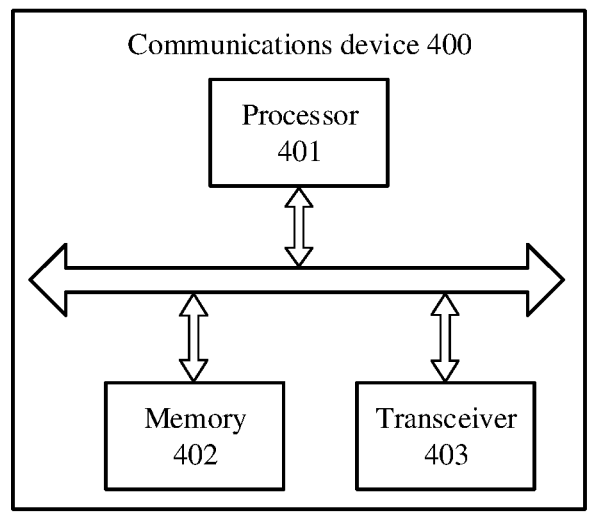
FIG. 4 is a schematic block diagram of a communications device that is applied to an embodiment of this application.

FIG. 4 is a schematic block diagram of a communications device 400 (or a message transmission apparatus) that is applied to an embodiment of this application. The service capability exposure function entity 101, the server 102, or the broadcast/multicast service center 103 in FIG. 1 may be implemented by the communications device in FIG. 4.

As shown in FIG. 4, the communications device 400 includes a processor 401, a memory 402, and a transceiver 403. Optionally, the transceiver 403 may further include a receiver and a transmitter. The receiver is configured to implement a receiving function, and the transmitter is configured to implement a sending function. This is not limited.

The processor 401, the memory 402, and the transceiver 403 communicate with each other by using an internal connection channel, to transfer a control and/or a packet.

It may be understood that, although not shown, the communications device 400 may further include another apparatus, for example, an input apparatus, an output apparatus, or a battery.

Optionally, in some embodiments, the memory 402 may store an execution instruction used to perform a method in the embodiments of this application. The processor 401 may execute the instruction stored in the memory 402 and complete, in combination with other hardware (for example, the transceiver 403), to complete the steps performed in the methods shown below. For a specific working process and beneficial effects, refer to descriptions in the following method embodiments.

The methods disclosed in the embodiments of this application may be applied to a processor or may be implemented by the processor. The processor may be an integrated circuit chip and has a signal processing capability. In an implementation process, steps in the foregoing method embodiments can be implemented by using a hardware integrated logical circuit in the processor, or by using an instruction in a form of software. The processor may be a general-purpose processor, a digital signal processor (DSP), an application-specific integrated circuit (ASIC), a field programmable gate array (FPGA) or another programmable logic device, a discrete gate or a transistor logic device, a discrete hardware component, a system on chip (SoC), a central processing unit (CPU), a network processor (NP), a digital signal processing circuit (DSP), a micro controller unit (MCU), a programmable controller (PLD), or another integrated chip. The processor may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly executed and completed by using a hardware decoding processor, or may be executed and completed by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory of the systems and methods described in this specification includes but is not limited to these and any memory of another proper type.

The communications device 400 may be a general-purpose computer device or a dedicated computer device. In a specific implementation, the computer device 400 may be a desktop computer, a portable computer, a network server, a personal digital assistant (PDA), a mobile phone, a tablet computer, a wireless terminal device, a communications device, a built-in device, or a device with a structure similar to the structure in FIG. 4. A type of the communications device 400 is not limited in this embodiment of this application.

Figure 5:
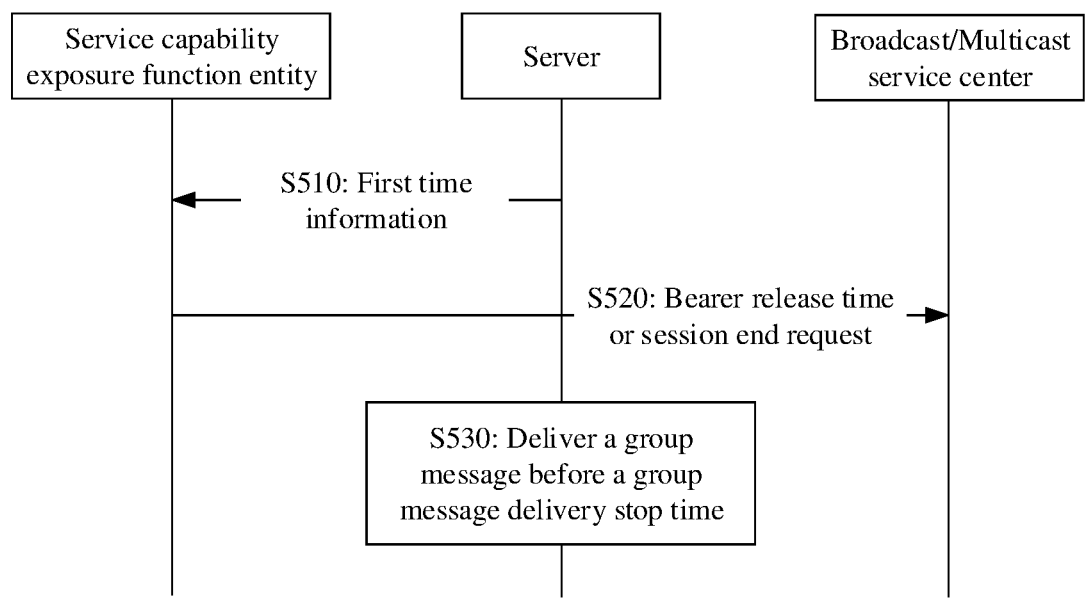
FIG. 5 is a schematic flowchart of a message transmission method according to an embodiment of this application.

FIG. 5 is a schematic flowchart of a message transmission method 500 according to an embodiment of this application. Optionally, a service capability exposure function entity in FIG. 5 may be an SCEF network element; a server may be an SCS/AS; and a broadcast/multicast service center may be a BM-SC. As shown in FIG. 5, the method 500 includes the following steps.

S510: The server sends first time information to the service capability exposure function entity, where the first time information is used to indicate a group message delivery stop time.

Correspondingly, the service capability exposure function entity receives the first time information provided by the server.

Optionally, the group message delivery stop time may be a moment, or may be a time period. In other words, the group message delivery stop time may be an absolute time, or a relative time. This is not limited in this embodiment of this application. Herein, if the group message delivery stop time is a time period, a moment at which delivering a group message stops is a group message delivery start time plus the time period.

Optionally, the first time information may be carried in a group message delivery request. The group message delivery request may be a message sent by the server to the capability exposure function entity in a group message delivery procedure.

Optionally, the group message delivery request may further carry a group identifier and the group message delivery start time. Optionally, the group message delivery start time may be an absolute time.

Optionally, the group message delivery request may further carry a group message payload.

S520: The service capability exposure function entity determines a bearer release time based on the first time information, and sends the bearer release time to the broadcast/multicast service center; or the service capability exposure function entity sends a session termination request to the broadcast/multicast service based on the first time information.

Optionally, the session termination request may also be replaced with a session stop request or a session end request, and is used to request the broadcast/multicast service center to terminate an ongoing session, so that the broadcast/multicast service center can release a bearer.

Optionally, the bearer release time is the same as the group message delivery stop time, or the bearer release time is later than the group message delivery stop time.

The bearer release time may be an MBMS bearer release time. For example, the service capability exposure function entity may determine an MBMS bearer start time based on an MBMS group message delivery start time. The MBMS bearer start time is the same as or earlier than the group message delivery start time. The service capability exposure function entity may determine the MBMS bearer release time based on an MBMS group message delivery stop time. The MBMS bearer release time is the same as or later than the group message delivery stop time.

Optionally, in this embodiment of this application, the bearer release time may also be referred to as a bearer deactivation time.

A bearer start time may be referred to as a bearer activation time or a bearer creation time.

Optionally, in this embodiment of this application, the bearer release time may be a time period, or a moment. In other words, the bearer release time may be a relative time or an absolute time. Herein, if the bearer release time is a time period, a moment at which the broadcast/multicast service center releases the bearer is the bearer start time plus the time period.

Optionally, in an embodiment, after obtaining the bearer release time, the service capability exposure function entity may send the bearer release time to the broadcast/multicast service center, to create the bearer. Correspondingly, the broadcast/multicast service center initiates a bearer activation procedure before or at the bearer release time, to create the bearer. Optionally, the broadcast/multicast service center may also determine a window period of the bearer based on network configuration. This is not limited.

Optionally, in an embodiment, the service capability exposure function entity may alternatively send the session termination request to the broadcast/multicast service center based on the first time information. The session termination request is used to request the broadcast/multicast service center to terminate the ongoing session, so that the broadcast/multicast service center can release the bearer.

Specifically, if the service capability exposure function entity is sending a session creation request to the broadcast/multicast service center, the service capability exposure function entity sends the session termination request to the broadcast/multicast service center at or after the group message delivery stop time (that is, at or after the time indicated by the first time information).

S530: The server delivers a group message before the group message delivery stop time.

In this embodiment of this application, the server sends the first time information to the service capability exposure function entity, and the first time information is used to indicate the group message delivery stop time. In this way, the service capability exposure function entity determines the bearer release time based on the group message delivery stop time, to ensure that the server completes delivering the group message before the group message delivery stop time.

Optionally, the method 500 may further include the following steps.

The server sends a first group message delivery complete indication to the service capability exposure function entity. Optionally, the first group message delivery complete indication may be a control plane message, or may be a user plane packet that carries a special identifier, and is used to indicate that the server has completed delivering the group message.

Correspondingly, if the service capability exposure function entity receives the first group message delivery complete indication from the server and completes delivering the group message, the service capability exposure function entity sends a second group message delivery complete indication to the server. The second group message delivery complete indication is used to indicate that the service capability exposure function entity has completed delivering the group message.

Specifically, if the service capability exposure function entity receives the first group message delivery complete indication from the server and learns that the server has completed delivering the group message, and the service capability exposure function entity also completes delivering the group message, the service capability exposure function entity sends the second group message delivery complete indication to the server, to notify the server that the service capability exposure function entity has completed delivering the group message.

Optionally, the method 500 may further include the following steps.

The server sends second time information to the service capability exposure function entity. The second time information includes a preset time period.

Optionally, the second time information may also be carried in the group message delivery request.

Correspondingly, the service capability exposure function entity receives the second time information from the server. If the service capability exposure function entity does not receive, within the preset time period, data sent by the server, the service capability exposure function entity sends the second group message delivery complete indication to the server.

Specifically, if the service capability exposure function entity does not detect, within the preset time period, user plane data sent by the server, the service capability exposure function entity may determine that delivering the group message stops. For example, the preset time period may be referred to as an inactive time period.

Further, in this embodiment of this application, the service capability exposure function entity may further modify the group message delivery stop time. Optionally, the method 500 may further include the following steps.

The broadcast/multicast service center sends an adjusted bearer release time to the service capability exposure function entity.

Correspondingly, the service capability exposure function entity receives the adjusted bearer release time sent by the broadcast/multicast service center. The service capability exposure function entity determines third time information based on the adjusted bearer release time, and sends the third time information to the server. The third time information is used to indicate an adjusted group message delivery stop time.

Optionally, an adjustment in this embodiment of this application may include operations such as addition, reduction, update, replacement, and modification. A specific adjustment may be determined based on a requirement. This is not specifically limited in this embodiment of this application. An adjustment in the following may also be explained in this way. This is uniformly described herein, and details are not described below again.

Optionally, the adjusted group message delivery stop time is the same as the adjusted bearer release time, or the adjusted group message delivery stop time is earlier than the adjusted bearer release time.

Specifically, the broadcast/multicast service center may modify the bearer release time according to a network policy, and return a modified bearer release time to the service capability exposure function entity. The service capability exposure function entity determines a new group message delivery stop time (the new group message delivery stop time may be understood as the adjusted group message delivery stop time) based on the modified bearer release time, and notifies the server of the new group message delivery stop time, so that the server can deliver the group message before the new group message delivery stop time. The new group message delivery stop time is the same as the adjusted bearer release time, or the new group message delivery stop time is earlier than the adjusted bearer release time. Therefore, the service capability exposure function entity may adjust the group message delivery stop time based on the adjusted bearer release time.

Optionally, the server may also adjust the group message delivery stop time. Optionally, the server may also adjust the preset time period included in the second time information. This is not limited.

To help a person skilled in the art understand the message transmission method in the embodiments of this application, the following describes the method in the embodiments of this application in detail with reference to an example in FIG. 6A, FIG. 6B, FIG. 6C, and FIG. 7. It should be understood that, the example in FIG. 6A, FIG. 6B, FIG. 6C, and FIG. 7 is merely intended to help a person skilled in the art understand the embodiments of this application, instead of limiting the embodiments of this application to a specific scenario in the example. A person skilled in the art may apparently make various equivalent modifications or changes based on the example shown in FIG. 6A, FIG. 6B, FIG. 6C, and FIG. 7, and such modifications or changes also fall within the scope of the embodiments of this application. In the following example, an SCEF is used as a service capability exposure entity; an SCS/AS is used as a server; a BM-SC is used as a broadcast/multicast service center; and UE is used as a terminal. This is uniformly described herein. Optionally, the example in FIG. 6A, FIG. 6B, FIG. 6C, and FIG. 7 may further include a RAN, and an MBMS-GW/ gateway GPRS support node (GGSN)/MME/serving GPRS support node (SGSN). It should be understood that, for an explanation of a term or a concept that is the same as a term or a concept in an existing procedure, refer to descriptions in the prior art. For brevity, details are not described in the embodiments of this application.

Figure 6A:
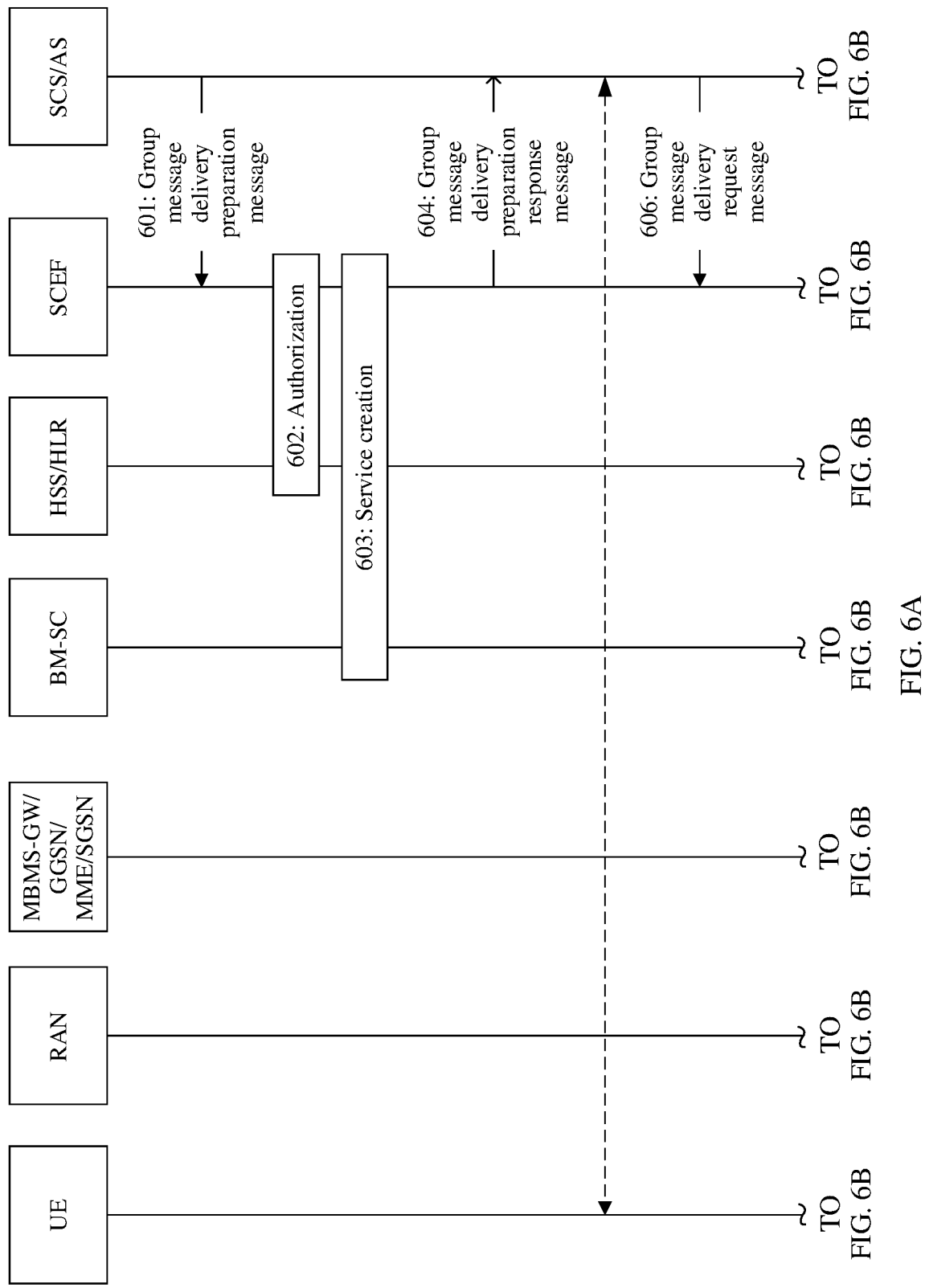
FIG. 6A, FIG. 6B, and FIG. 6C are a schematic flowchart of an example of a message transmission method according to an embodiment of this application.
Figure 6B:
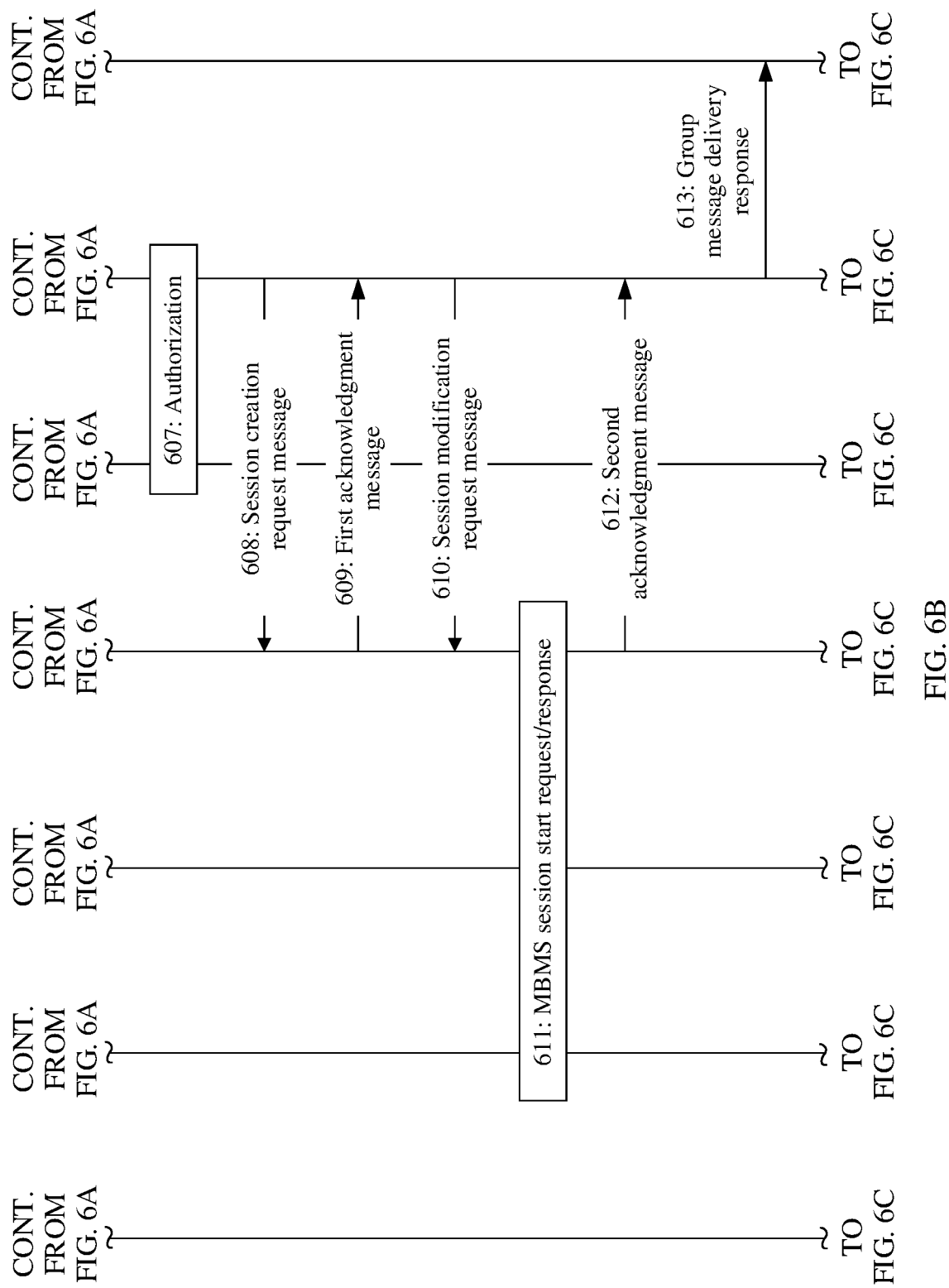
Figure 6C:
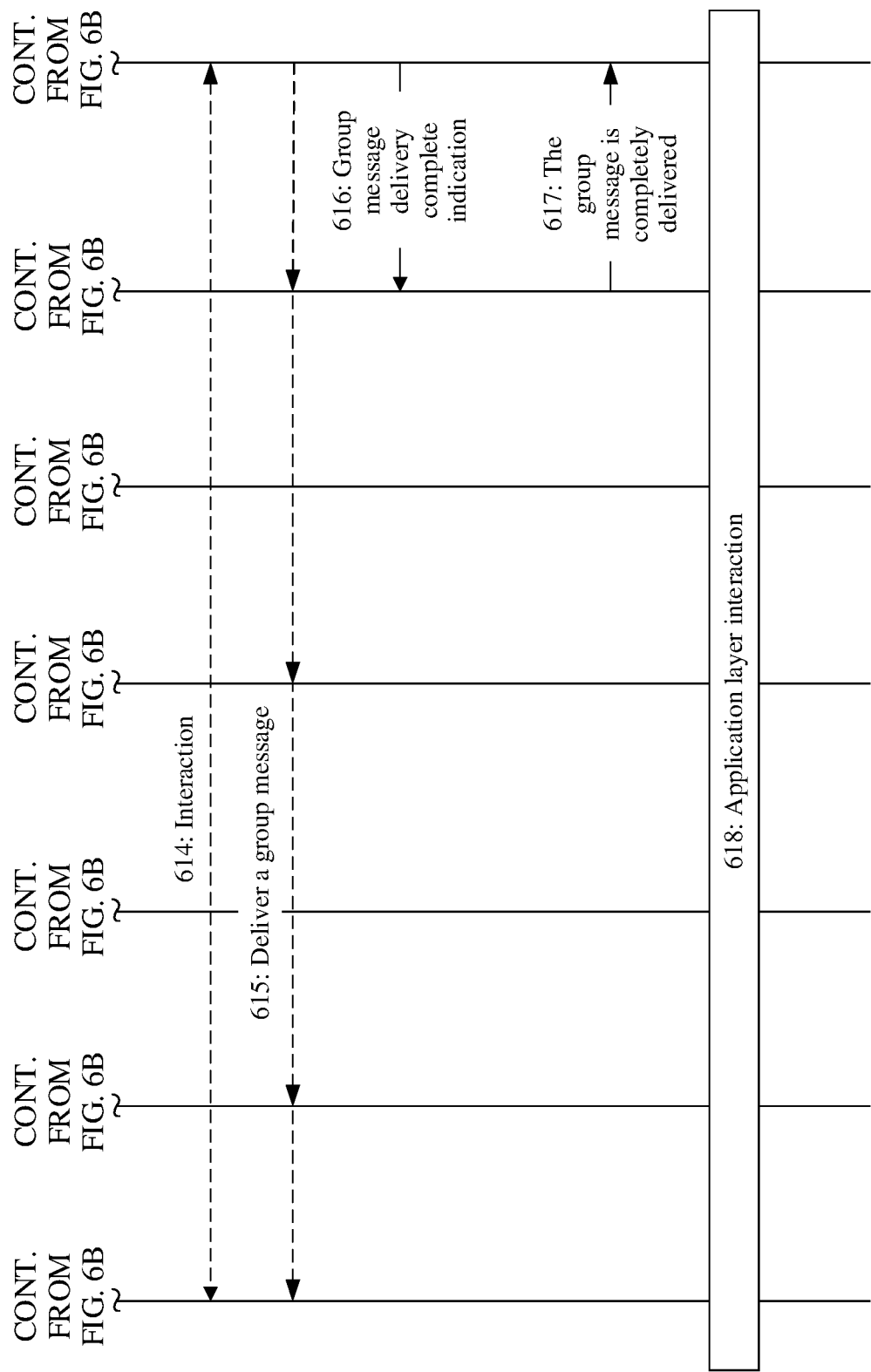

As shown in FIG. 6A, FIG. 6B, and FIG. 6C, a procedure in the example includes the following steps.

601: The SCS/AS sends a group message delivery preparation message to the SCEF.

Optionally, the group message delivery preparation message carries an external group identifier and an SCS identifier.

602: The SCEF interacts with an HSS/home location register (HLR) to determine whether the SCS/AS can authorize to prepare for delivering a group message.

603: If the authorization succeeds, the SCEF interacts with the BM-SC, creates a service resource in the BM-SC, and obtains a related attribute of the Service Resource from the BM-SC, where the related attribute of the Service Resource includes a Resource ID.

604: The SCEF returns a group message delivery preparation response message to the SCS/AS, where the group message delivery preparation response message carries the Resource ID.

605: The SCS/AS interacts with the UE, and provides information such as the Resource ID to the UE.

606: The SCS/AS sends a group message delivery request message to the SCEF.

The group message delivery request message carries a group identifier and a group message delivery start time Start_time1, and may further carry a group message payload.

Herein, different from the existing procedure, the SCS/AS further provides the SCEF with the group message delivery stop time Stop_time1 and an Inactive Time. The Inactive Time is used to indicate a time period in which user plane data sent by the SCS/AS is not detected. In other words, the Inactive Time indicates that delivering the group message stops. The Stop_time1 and the Inactive Time may be carried in the group message delivery request message.

607: The SCEF interacts with the HSS/HLR to determine whether the SCS/AS can authorize to deliver the group message.

Optionally, the HSS/HLR or the SCEF checks the Start_time1 and the Stop_time1 that are provided by the SCS/AS, to determine whether a carrier policy is met.

608: If the authorization succeeds, the SCEF sends a session creation request message to the BM-SC.

The session creation request message is used to request to further create a session resource Session Resource based on the Service Resource created in the step 603.

609: The BM-SC sends a first acknowledgment message (for example, an OK message) to the SCEF, and creates the Session Resource based on the Service Resource created in the step 603.

Correspondingly, the SCEF determines an MBMS Bearer creation (or activation) time Start_time2 based on the Start timer. A value of the Start_time1 is the same as or less than that of the Start timer.

In addition, the SCEF determines an MBMS Bearer release (or deactivation) time Stop_time2 based on the Stop_time1. A value of the Stop_time2 is the same as or greater than that of the Stop_time1.

Optionally, the SCEF may send a session termination request to the BM-SC at or after the Stop_time1. The session termination request is used to request the BM-SC to terminate an ongoing session. Specifically, the BM-SC initiates an MBMS Bearer Service deactivation procedure based on the session termination request, to release an MBMS bearer.

610: The SCEF sends a session modification request message to the BM-SC, where the session modification request message carries the Start_time2 and the Stop_time2.

611: The BM-SC initiates an MBMS Bearer Service activation procedure (specifically, an MBMS session start request or response).

Specifically, the BM-SC stores received information, namely, the Start_time2 and the Stop_time2. Before or at the Start_time2, the BM-SC initiates the MBMS Bearer Service activation procedure to create (or activate) the MBMS Bearer. The MBMS Bearer Service deactivation procedure is initiated at or after the Stop_time2 to release (or deactivate) the MBMS Bearer. Alternatively, the BM-SC sends the Stop_time2 to another downstream network element, and the BM-SC and the another downstream network element locally delete (or deactivate) the MBMS bearer at or after the Stop_time2.

Optionally, the BM-SC may change the Stop_time2 to Stop_time3 according to a network policy, and initiate the MBMS Bearer Service deactivation procedure at or after the Stop_time3 to release the MBMS Bearer. Alternatively, the BM-SC sends the Stop_time3 to the another downstream network element, and the BM-SC and the another downstream network element locally delete (or deactivate) the bearer at or after the Stop_time3.

612: The BM-SC returns a second acknowledgment message to the SCEF.

Optionally, if the BM-SC changes the Stop_time2 to the Stop_time3, the BM-SC returns the Stop_time3 to the SCEF.

613: The SCEF returns a group message delivery response to the SCS/AS.

Herein, if the BM-SC returns the new MBMS bearer release time Stop_time3, the SCEF determines a new group message delivery stop time Stop_time4 based on the Stop_time3. A value of the Stop_time4 is the same as or less than that of the Stop_time3. Optionally, the SCEF may return the Stop_time4 to the SCS/AS.

Optionally, the SCEF may send the session termination request to the BM-SC at or after the Stop_time3. The session termination request is used to request the BM-SC to terminate the ongoing session. The BM-SC initiates the MBMS Bearer Service deactivation procedure based on the session termination request to release the MBMS bearer.

614: The SCS/AS performs user plane interaction with the UE.

615: Deliver the group message (for example, the group message sequentially passes through network elements such as the SCS/AS, the BM-SC, the RAN, and the UE).

If the group message delivery request message in the step 606 carries the group message payload, the SCEF sends the group message payload to the BM-SC at the Start_time1. Otherwise, the SCS/AS sends the group message payload to the SCEF at or after the Start_time1, and the SCEF further sends the group message payload to the BM-SC. The SCS/AS completes delivering the group message before the Stop_time1.

Alternatively, if the SCS/AS receives the Stop_time4 in step 613, the group message is completely delivered before or at the Stop_time4.

616: If the SCS/AS does not provide the Inactive Time in the step 606, the SCS/AS may send a group message delivery complete indication to the SCEF.

Optionally, the indication may be a control plane message, or a user plane packet that carries a special identifier.

617: The SCEF sends a group message delivery completion response to the SCS/AS.

Specifically, after the SCEF completes delivering the group message, if the SCEF does not receive a new packet (if the SCS/AS provides the Inactive Time in the step 606) within an Inactive Time interval, or receives the group message delivery complete indication in the step 616, the SCEF sends the group message delivery complete response to the SCS/AS.

618: After the UE receives the group message payload, the UE performs application layer interaction with the SCS/AS.

Therefore, in this embodiment, the SCS/AS provides the Stop_time1 to the SCEF, so that the SCEF determines the MBMS Bearer release time based on the Stop_time1, to ensure that the SCS/AS completes delivering the group message before the MBMS Bearer is released. In addition, the SCEF may modify the Stop_time1 based on the new MBMS bearer release time Stop_time3 returned by the BM-SC.

Figure 7:
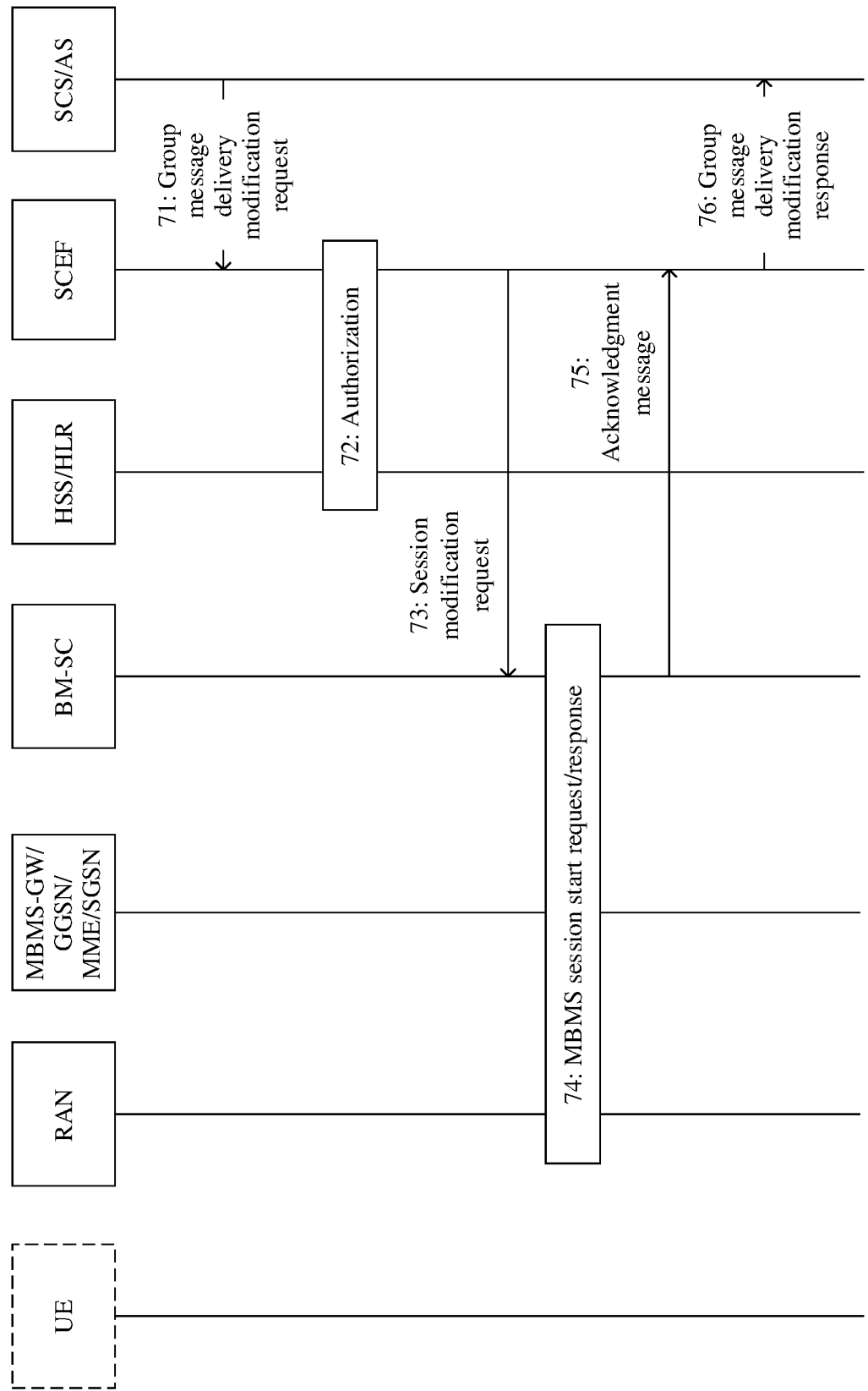
FIG. 7 is a schematic flowchart of another example of a message transmission method according to an embodiment of this application.

Further, the SCS/AS may modify the Stop_time1. As shown in FIG. 7, the procedure in the example includes the following steps.

71: The SCS/AS sends a group message delivery modification request to the SCEF.

When the Stop_time1 is about to expire, if the SCS/AS needs to continue delivering the group message, the SCS/AS sends the group message delivery modification request to the SCEF. The group message delivery modification request carries a new group message delivery stop time Stop_time1*. Optionally, the group message delivery modification request may further carry a new Start_time1*. Optionally, the group message delivery modification request may further carry a new Inactive Time*.

72: The SCEF interacts with the HSS/HLR to authorize the group message delivery modification request of the SCS/AS.

Optionally, the HSS/HLR or the SCEF checks the Start_time1* and the Stop_time1* that are provided by the SCS/AS, to determine whether a carrier policy is met.

73: The SCEF sends a session modification request to the BM-SC.

After the authorization succeeds, the SCEF determines an MBMS Bearer release (or deactivation) time Stop_time2* based on the Stop_time1*. The SCEF sends the session modification request to the BM-SC. The session modification request carries the Stop_time2*.

74: The BM-SC updates MBMS Bearer Service duration (specifically, the MBMS session start request or response is used).

Specifically, the BM-SC updates the MBMS Bearer Service duration based on the Stop_time2*, and the BM-SC initiates the MBMS Bearer Service deactivation procedure at or after the Stop_time2*, to release (or deactivate) the MBMS Bearer.

Optionally, the BM-SC may change the Stop_time2* to the Stop_time3* according to the network policy, and initiate the MBMS Bearer Service deactivation procedure at or after the Stop_time3*, to release the MBMS Bearer.

75: The BM-SC returns an acknowledgment message to the SCEF. The acknowledgment message carries the Stop_time3*.

If the BM-SC changes the Stop_time2* to the Stop_time3*, the BM-SC returns the Stop_time3* to the SCEF.

76: The SCEF sends a group message delivery modification response to the SCS/AS.

Optionally, if the BM-SC returns the new MBMS bearer release time Stop_time3*, the SCEF determines a new group message delivery stop time Stop_time4* based on the Stop_time3*. A value of the Stop_time4* is the same as or less than that of the Stop_time3*.

Optionally, the group message delivery modification response carries the Stop_time4*.

Therefore, in this embodiment, the SCS/AS may modify the Stop_time1 to the Stop_time1*, so that the group message delivery may be performed before the modified Stop_time1*.

This application further provides another embodiment. In this embodiment, the service capability exposure function entity may determine the group message delivery stop time.

Figure 8:
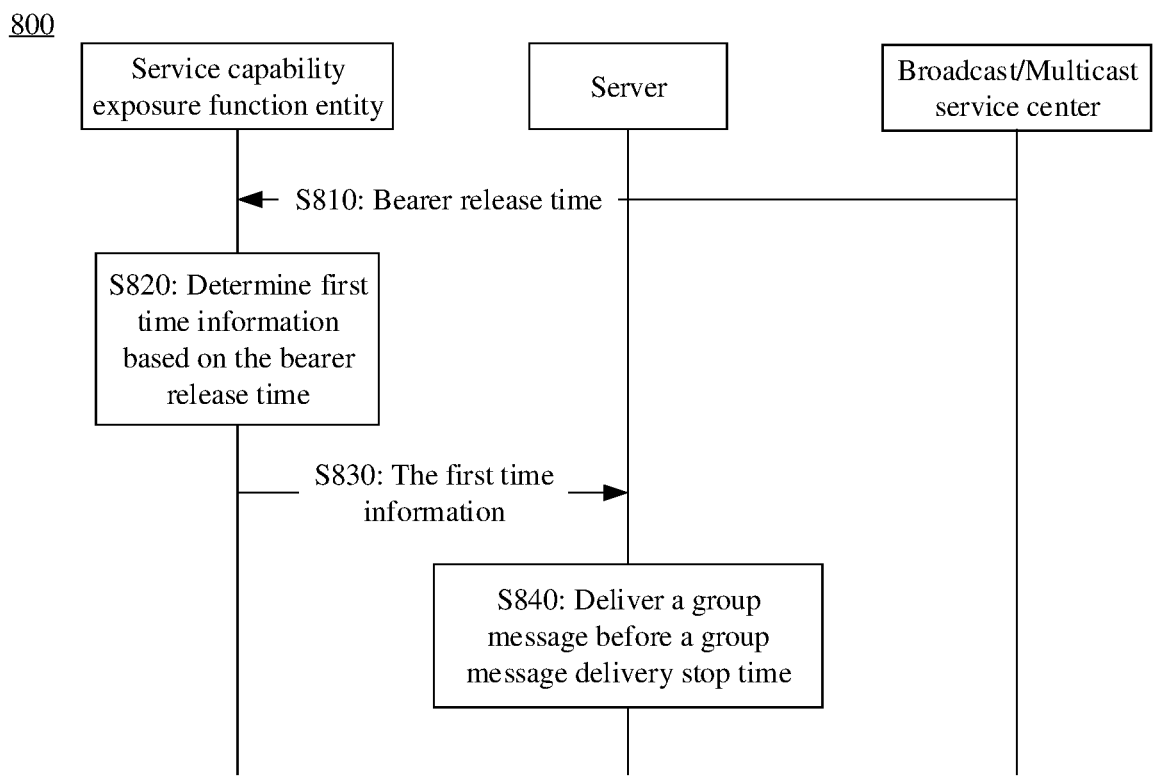
FIG. 8 is a schematic flowchart of a message transmission method according to another embodiment of this application.

FIG. 8 is a schematic flowchart of a message transmission method 800 according to another embodiment of this application. Optionally, a service capability exposure function entity in FIG. 8 may be an SCEF network element; a server may be an SCS/AS; and a broadcast/multicast service center may be a BM-SC. As shown in FIG. 8, the method 800 includes the following steps.

S810: The broadcast/multicast service center sends a bearer release time to the service capability exposure function entity. Correspondingly, the service capability exposure function entity receives the bearer release time.

S820: The service capability exposure function entity determines first time information based on the bearer release time, where the first time information is used to indicate a group message delivery stop time.

Optionally, the group message delivery stop time is the same as the bearer release time, or the group message delivery stop time is earlier than the bearer release time.

S830: The service capability exposure function entity sends the first time information to the server. Correspondingly, the server receives the first time information.

S840: The server delivers a group message before the group message delivery stop time.

In this embodiment of this application, the service capability exposure function entity obtains the bearer release time provided by the broadcast/multicast service center, determines the group message delivery stop time based on the bearer release time, and notifies the server of the group message delivery stop time. In this way, the server delivers the group message before the group message delivery stop time, to ensure that the server completes delivering the group message before a bearer is released.

Optionally, the method Boo may further include the following steps.

The server sends a first group message delivery complete indication to the service capability exposure function entity. Optionally, the first group message delivery complete indication may be a control plane message, or may be a user plane packet that carries a special identifier, and is used to indicate that the server has completed delivering the group message.

Correspondingly, if the service capability exposure function entity receives the first group message delivery complete indication from the server and completes delivering the group message, the service capability exposure function entity sends a second group message delivery complete indication to the server. The second group message delivery complete indication is used to indicate that the service capability exposure function entity has completed delivering the group message.

It should be understood that for a specific implementation of this solution, refer to the foregoing descriptions in the method 500. For brevity, details are not described again.

Optionally, the method Boo may further include the following steps.

The server sends second time information to the service capability exposure function entity. The second time information includes a preset time period.

Optionally, the second time information may also be carried in the group message delivery request.

Correspondingly, the service capability exposure function entity receives the second time information from the server. If the service capability exposure function entity does not receive, within the preset time period, data sent by the server, the service capability exposure function entity sends the second group message delivery complete indication to the server.

It should be understood that for a specific implementation of this solution, refer to the foregoing descriptions in the method 500. For brevity, details are not described again.

Optionally, the method Boo further includes the following steps.

The server sends an adjustment instruction to the service capability exposure function entity. The adjustment instruction is used to adjust the group delivery message stop time.

Correspondingly, the service capability exposure function entity receives the adjustment instruction. The service capability exposure function entity obtains an adjusted bearer release time according to the adjustment instruction.

The service capability exposure function entity determines an adjusted group message delivery stop time based on the adjusted bearer release time, where the adjusted group message delivery stop time is the same as or earlier than the adjusted bearer release time; and sends the adjusted group message delivery stop time to the server.

In other words, the server may extend the group message delivery stop time. Specifically, the server sends the adjustment instruction to the service capability exposure function entity, so that the service capability exposure function entity determines the adjusted group message delivery stop time according to the adjustment instruction.

To help a person skilled in the art understand the message transmission method in the embodiments of this application, the following describes the method in the embodiments of this application in detail with reference to an example in FIG. 9A, FIG. 9B, FIG. 9C, and FIG. 10. It should be understood that, the example in FIG. 9A, FIG. 9B, FIG. 9C, and FIG. 10 is merely intended to help a person skilled in the art understand the embodiments of this application, instead of limiting the embodiments of this application to a specific scenario in the example. A person skilled in the art may apparently make various equivalent modifications or changes based on the example shown in FIG. 9A, FIG. 9B, FIG. 9C, and FIG. 10, and such modifications or changes also fall within the scope of the embodiments of this application. In the following example, an SCEF is used as a service capability exposure entity; an SCS/AS is used as a server; a BM-SC is used as a broadcast/multicast service center; and UE is used as a terminal. This is uniformly described herein. Optionally, the example in FIG. 9A, FIG. 9B, FIG. 9C, and FIG. 10 may further include a RAN and an MBMS-GW/GGSN/MME/SGSN. It should be understood that, for an explanation of a term or a concept that is the same as a term or a concept in an existing procedure, refer to descriptions in the prior art. For brevity, details are not described in the embodiments of this application.

Figure 9A:
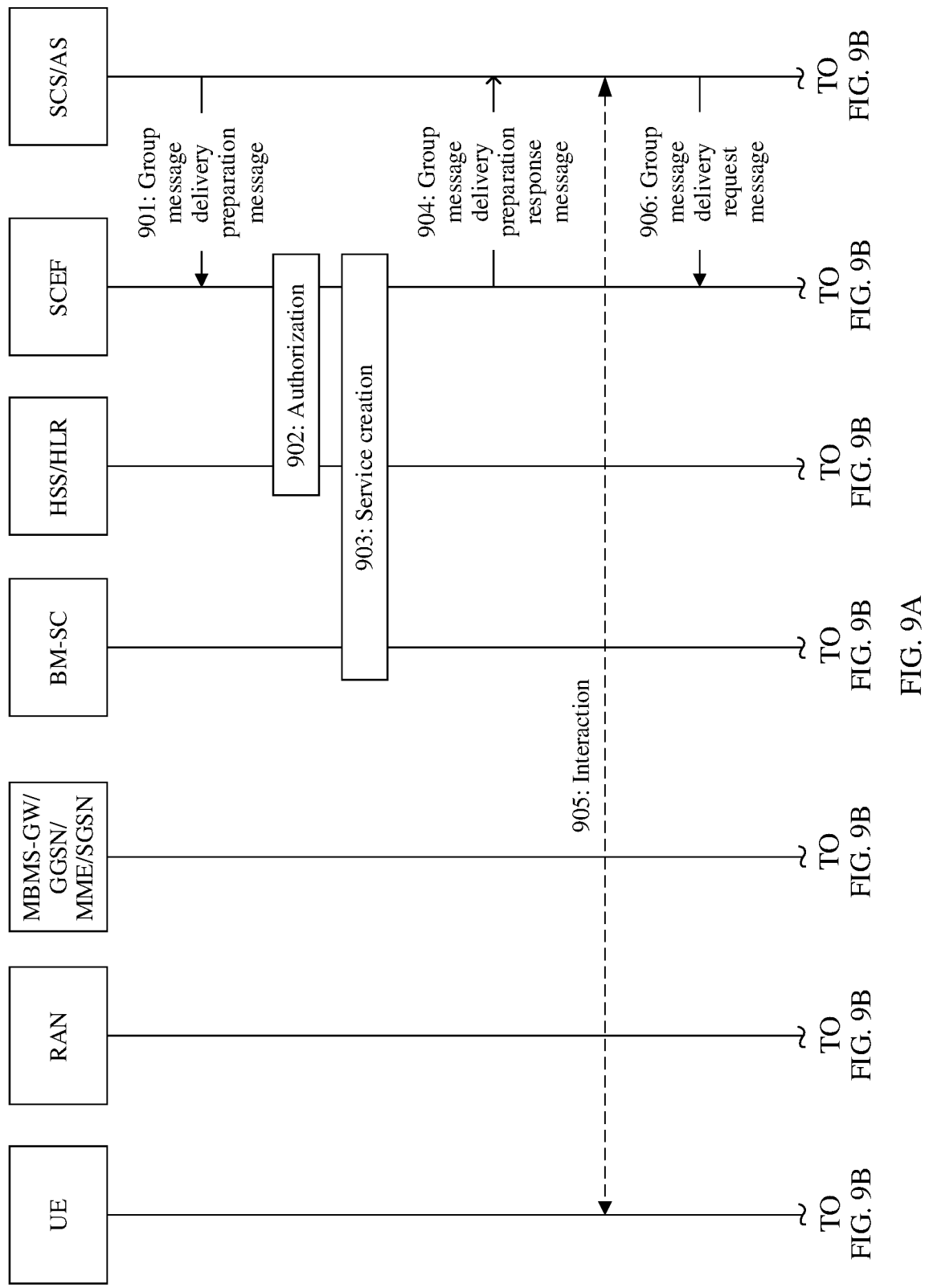
Figure 9B:
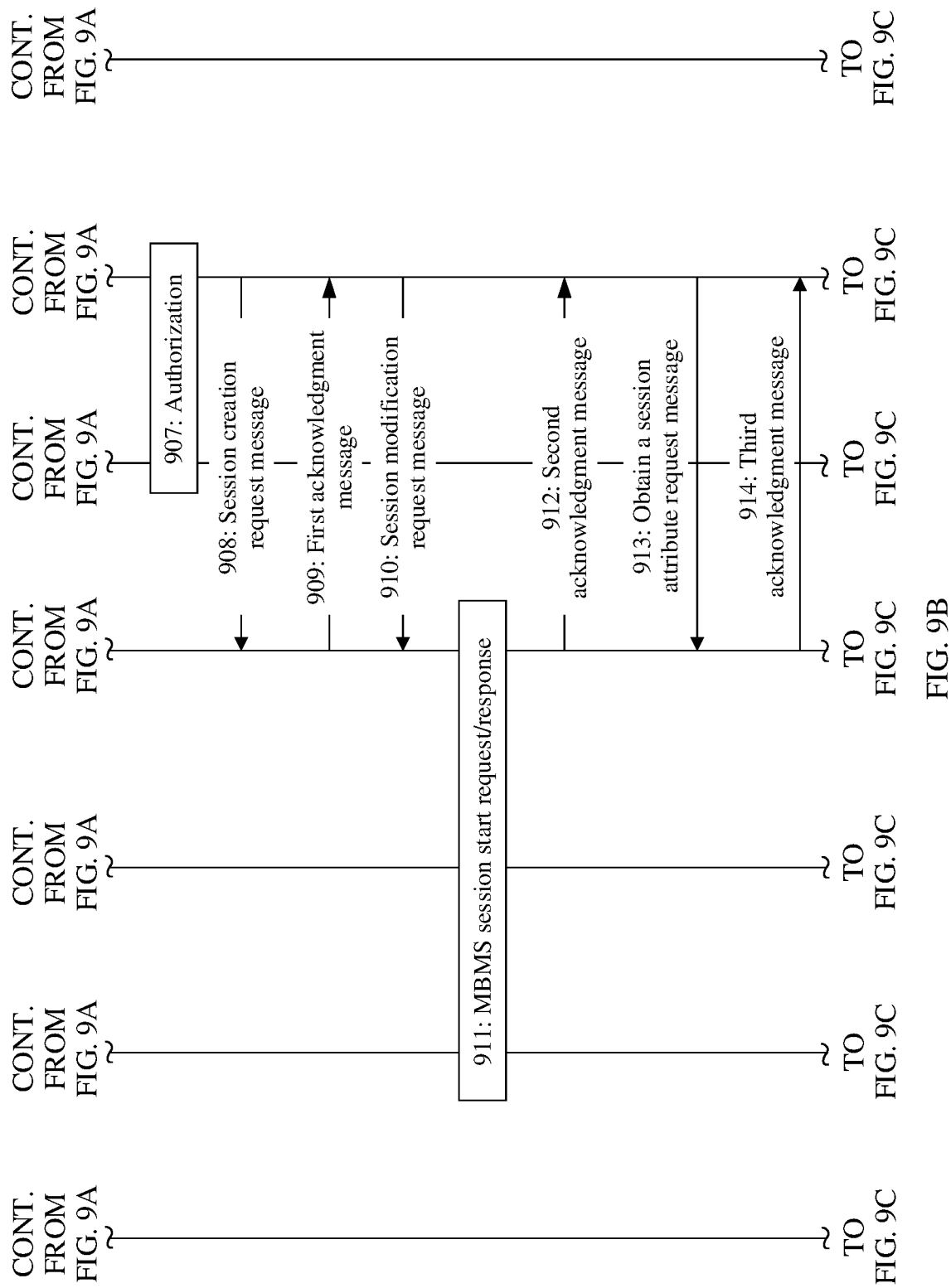

As shown in FIG. 9A, FIG. 9B, and FIG. 9C, a procedure in the example includes the following steps.

901: The SCS/AS sends a group message delivery preparation message to the SCEF.

Optionally, the group message delivery preparation message carries an external group identifier and an SCS identifier.

902: The SCEF interacts with the HSS/HLR to determine whether the SCS/AS can authorize to prepare for delivering a group message.

903: If the authorization succeeds, the SCEF interacts with the BM-SC, creates a service resource in the BM-SC, and obtains a related attribute of the Service Resource from the BM-SC, where the related attribute of the Service Resource includes a Resource ID.

904: The SCEF returns a group message delivery preparation response message to the SCS/AS, where the group message delivery preparation response message carries the Resource ID.

905: The SCS/AS interacts with the UE, and provides information such as the Resource ID.

906: The SCS/AS sends a group message delivery request message to the SCEF.

Optionally, the group message delivery request message carries an Inactive Time. The Inactive Time is used to indicate that if the SCEF does not detect, in a period of time, user plane data sent by the SCS/AS, it is determined that delivering the group message stops.

907: The SCEF interacts with the HSS/HLR to determine whether the SCS/AS can authorize to deliver the group message.

908: If the authorization succeeds, the SCEF sends a session creation request message to the BM-SC, to request to further create a Session Resource based on the Service Resource created in the step 903.

909: The BM-SC sends a first acknowledgment message to the SCEF.

The BM-SC creates the Session Resource based on the Service Resource created in the step 903.

910: The SCEF sends a session modification request message to the BM-SC.

The SCEF determines an MBMS Bearer creation (or activation) time Start_time2 based on a Start timer. A value of the Start_time2 is the same as or less than that of the Start_time1. The session modification request message includes the MBMS Bearer creation (or activation) time Start_time2.

911: The BM-SC initiates an MBMS Bearer Service activation procedure (specifically, an MBMS session start request or response is used).

Specifically, the BM-SC stores received information. The BM-SC initiates the MBMS Bearer Service activation procedure to create an MBMS bearer before or at the Start_time2. The BM-SC determines an MBMS Bearer window period based on network configuration.

912: The BM-SC returns a second acknowledgment message to the SCEF.

913: The SCEF sends a session attribute obtaining request message to the BM-SC. The session attribute obtaining request message is used to request to obtain a session attribute, for example, an MBMS bearer release time.

914. The BM-SC returns a third acknowledgment message to the SCEF, where the third acknowledgment message carries an MBMS bearer release time Stop_time1.

915. The SCEF returns a group message delivery response message to the SCS/AS.

The SCEF determines a group message delivery stop time Stop_time2 based on the Stop_time1. A value of the Stop_time2 is the same as or greater than that of the Stop_time1. The group message delivery response message carries the Stop_time2.

916: The SCS/AS performs user plane interaction with the UE.

917: Deliver a group message (for example, the group message sequentially passes through network elements such as the SCS/AS, the BM-SC, the RAN, and the UE).

If a group message payload is carried in the step 906, the SCEF sends the group message payload to the BM-SC at the Start_time1. Otherwise, the SCS/AS sends the group message payload to the SCEF at or after the Start_time1, and the SCEF further sends the group message payload to the BM-SC. The SCS/AS completes delivering the group message before the Stop_time2.

918: If the SCS/AS does not provide the Inactive Time in the step 606, the SCS/AS may send a group message delivery complete indication to the SCEF. The indication may be a control plane message, or a user plane packet that carries a special identifier.

919: The SCEF sends a group message delivery complete response to the SCS/AS.

Specifically, after the SCEF completes delivering the group message, if the SCEF does not receive a new packet (if the SCS/AS provides the Inactive Time in step 606) within an Inactive Time interval, or receives the group message delivery complete indication in the step 918, the SCEF sends the group message delivery completion response to the SCS/AS.

920: After the UE receives the group message payload, the UE performs application layer interaction with the SCS/AS.

Therefore, in this embodiment, the SCEF provides the group message delivery stop time Stop_time2 to the SCS/AS, so that the group message delivery is performed based on the Stop_time2.

Further, the SCS/AS may modify the group message delivery stop time Stop_time2.

Figure 10:
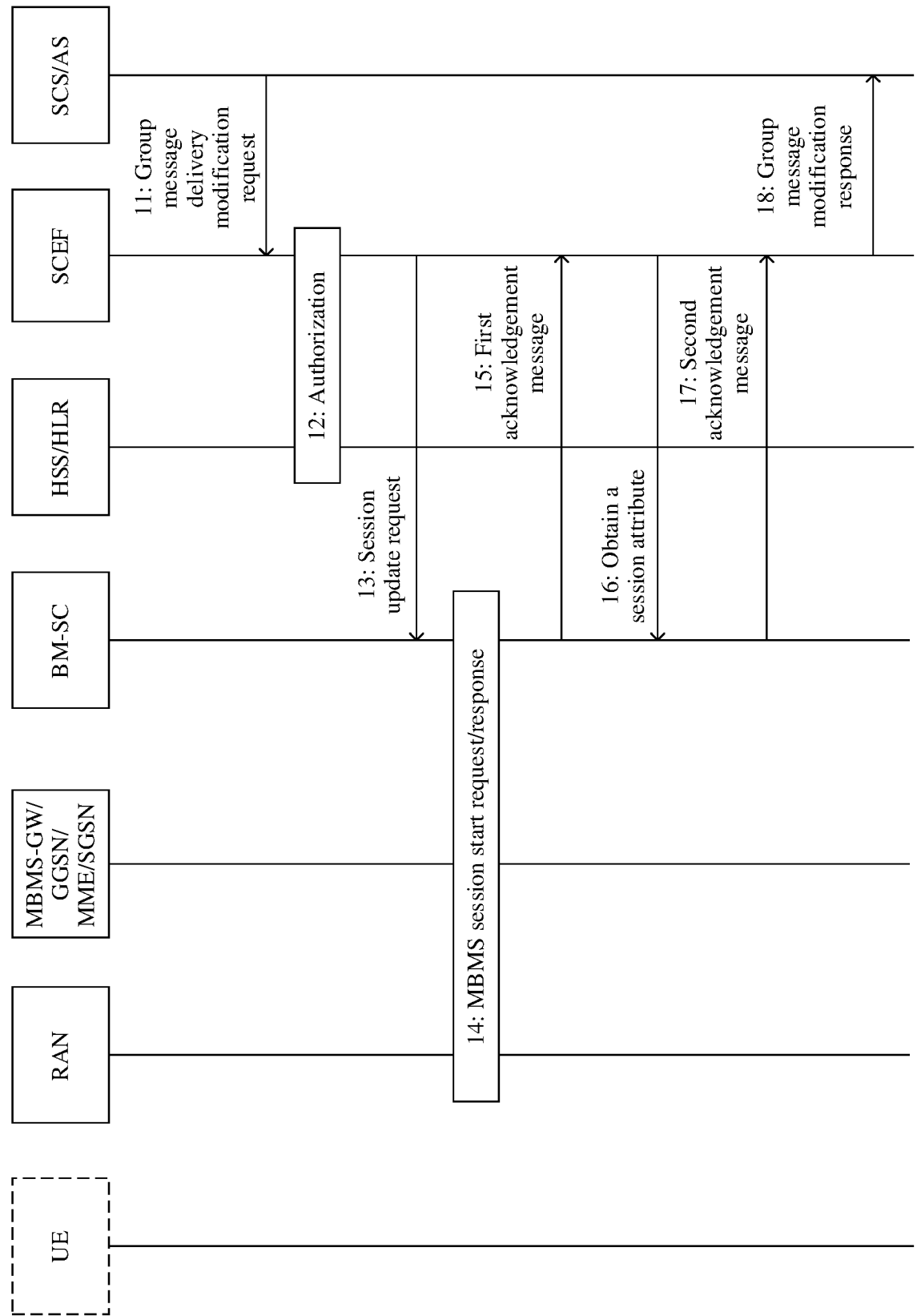
FIG. 10 is a schematic flowchart of another example of a message transmission method according to another embodiment of this application.

As shown in FIG. 10, the procedure in the example includes the following steps.

11: When the Stop_time2 is about to expire, the SCS/AS sends a group message delivery modification request to the SCEF.

The group message delivery modification request carries a group message delivery stop time extension indication, and the group message delivery stop time extension indication is used to request to adjust or modify the group message delivery stop time.

Optionally, the SCS/AC further provides a new Inactive Time* for the SCEF.

12: The SCEF interacts with the HSS/HLR to authorize the group message delivery modification request of the SCS/AS.

13: The SCEF sends a session update request to the BM-SC. The session update request carries the group message delivery stop time extension indication.

Specifically, after the authorization succeeds, the SCEF provides the BM-SC with the group message delivery stop time extension indication.

14: The BM-SC configures and extends a created MBMS Bearer Service window period based on the indication, to determine an MBMS bearer release time Stop_time3.

15: The BM-SC returns the first acknowledgment message to the SCEF.

16: The SCEF obtains the session attribute from the BM-SC.

17: The BM-SC sends the second acknowledgment message to the SCEF, where the second acknowledgment message carries the new Stop_time3.

18: The SCEF sends a group message delivery modification response to the SCS/AS.

Specifically, the SCEF determines a group message delivery stop time Stop_time4 based on the Stop_time3. A value of the Stop_time4 is the same as or less than that of the Stop_time3. The group message delivery modification response carries the Stop_time4.

Therefore, in this embodiment, the SCS/AS may send the group message delivery stop time extension indication to the SCEF, to obtain the modified group message delivery stop time Stop_time4, so that the group message can be delivered based on the modified Stop_time4.

It should be understood that the solutions in the embodiments of this application may be combined for use, and explanations or descriptions of terms in the embodiments may be cross-referenced or explained in the embodiments. This is not limited.

The foregoing describes in detail the message transmission methods according to the embodiments of this application with reference to FIG. 1 to FIG. 10. The following describes apparatuses for switching a user plane network element according to the embodiments of this application with reference to FIG. 11 to FIG. 13. It should be understood that the technical features described in the method embodiments are also applicable to the following apparatus embodiments.

Figure 11:
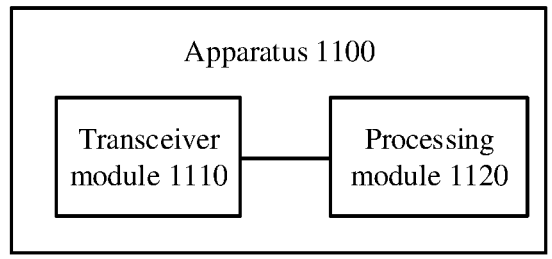
FIG. 11 is a schematic block diagram of a message transmission apparatus according to an embodiment of this application.

FIG. 11 is a schematic block diagram of a message transmission apparatus 1100 according to an embodiment of this application. Optionally, a specific form of the apparatus 1100 may be a general-purpose computer device or a chip in the general-purpose computer device. This is not limited in this embodiment of this application. The apparatus 1100 is a service capability exposure function entity. For example, the apparatus 1100 may be a SCEF network element. As shown in FIG. 11, the apparatus 1100 includes: a transceiver module 1110, configured to receive first time information provided by a server, where the first time information is used to indicate a group message delivery stop time; and a processing module 1120, configured to determine a bearer release time based on the first time information, and send the bearer release time to a broadcast/multicast service center; or send a session termination request to the broadcast/multicast service center based on the first time information.

Optionally, the bearer release time is the same as the group message delivery stop time, or the bearer release time is later than the group message delivery stop time.

Optionally, the transceiver module 1110 is further configured to: if the service capability exposure function entity receives a first group message delivery complete indication from the server and completes delivering a group message, send a second group message delivery complete indication to the server. The first group message delivery complete indication is used to indicate that the server has completed delivering the group message. The second group message delivery complete indication is used to indicate that the service capability exposure function entity has completed delivering the group message.

Optionally, the transceiver module 1110 is further configured to: receive second time information from the server, where the second time information includes a preset time period; and if the service capability exposure function entity does not receive, within the preset time period, data sent by the server, send the second group message delivery complete indication to the server.

Optionally, the transceiver module 1110 is further configured to receive an adjusted bearer release time sent by the broadcast/multicast service center.

Correspondingly, the processing module 1120 is specifically configured to determine third time information based on the adjusted bearer release time, and send the third time information to the server. The third time information is used to indicate an adjusted group message delivery stop time.

Optionally, the adjusted group message delivery stop time is the same as the adjusted bearer release time, or the adjusted group message delivery stop time is earlier than the adjusted bearer release time.

Optionally, the transceiver module 1110 is specifically configured to receive the first time information that is sent by the server by using a group message delivery request or a group message delivery modification request.

Optionally, after the service capability exposure function entity sends a session creation request to the broadcast/multicast service center, that the processing module 1120 is configured to send the session termination request to the broadcast/multicast service center based on the first time information specifically includes: sending the session termination request to the broadcast/multicast service center at or after the time indicated by the first time information.

It should be understood that the message transmission apparatus 1100 according to this embodiment of this application may correspondingly execute the methods of the service capability exposure function entity in the method embodiments, for example, the methods in FIG. 5 to FIG. 7. In addition, the foregoing and other management operations and/or functions of the modules in the apparatus 1100 are respectively used to implement corresponding steps of the methods of the service capability exposure function entity in the method embodiments. Therefore, beneficial effects in the method embodiments may also be achieved. For brevity, details are not described herein again.

The message transmission apparatus 1100 may further perform a message transmission method according to another embodiment of this application. Details are as follows: the transceiver module 1110 is configured to receive a bearer release time from a broadcast/multicast service center; the processing module 1120 is configured to determine first time information based on the bearer release time, and the first time information is used to indicate a group message delivery stop time; and the transceiver module 1110 is configured to send the first time information to a server.

Optionally, the group message delivery stop time is the same as the bearer release time, or the group message delivery stop time is earlier than the bearer release time.

Optionally, the transceiver module 1110 is configured to: if the service capability exposure function entity receives a first group message delivery complete indication from the server and completes delivering a group message, send a second group message delivery complete indication to the server. The first group message delivery complete indication is used to indicate that the server has completed delivering the group message. The second group message delivery complete indication is used to indicate that the service capability exposure function entity has completed delivering the group message.

Optionally, the transceiver module 1110 is further configured to receive second time information from the server. The second time information includes a preset time period. The transceiver module 1110 is configured to: if the service capability exposure function entity does not receive, within the preset time period, data sent by the server, send the second group message delivery complete indication to the server.

Optionally, the transceiver module 1110 is further configured to receive an adjustment instruction from the server. The adjustment instruction is used to adjust the group message delivery stop time.

Correspondingly, the processing module 1120 is specifically configured to obtain an adjusted bearer release time according to the adjustment instruction; and determine an adjusted group message delivery stop time based on the adjusted bearer release time. The adjusted group message delivery stop time is the same as or earlier than the adjusted bearer release time. The transceiver module 1110 is further configured to send the adjusted group message delivery stop time to the server.

It should be understood that the message transmission apparatus 1100 according to this embodiment of this application may correspondingly execute the methods of the service capability exposure function entity in the method embodiments, for example, the methods in FIG. 8 to FIG. 10. In addition, the foregoing and other management operations and/or functions of the modules in the apparatus 1100 are respectively used to implement corresponding steps of the methods of the service capability exposure function entity in the method embodiments. Therefore, beneficial effects in the method embodiments may also be achieved. For brevity, details are not described herein again.

It should further be understood that in this embodiment, the apparatus 1100 is presented in a form of a functional module. The "module" herein may be an application-specific integrated circuit ASIC, a circuit, a processor and a memory that execute one or more software or firmware programs, an integrated logic circuit, and/or another component that may provide the foregoing functions. In a simple embodiment, a person skilled in the art may figure out that the apparatus 1100 may be in a form shown in FIG. 4. The processing module 1120 may be implemented by the processor 401 and the memory 402 shown in FIG. 4. The transceiver module 1110 may be implemented by the transceiver 403 shown in FIG. 4. Specifically, a processor is implemented by executing a computer program stored in a memory. Optionally, when the apparatus 1100 is a chip, a function and/or an implementation process of the transceiver module 1120 may alternatively be implemented by a pin, a circuit, or the like. Optionally, the memory is a storage unit in the chip, for example, a register or a cache. The storage unit may alternatively be a storage unit, such as the memory 402 shown in FIG. 4, that is in the computer device and that is located outside the chip.

Figure 12:
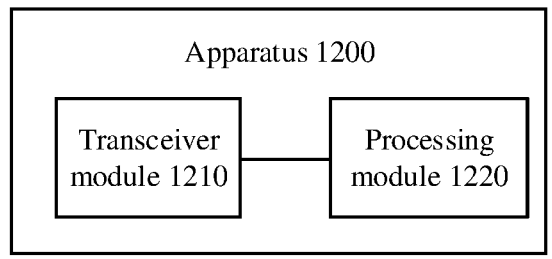
FIG. 12 is a schematic block diagram of a message transmission apparatus according to another embodiment of this application.

FIG. 12 is a schematic block diagram of a message transmission apparatus 1200 according to an embodiment of this application. Optionally, a specific form of the apparatus 1200 may be a general-purpose computer device or a chip in the general-purpose computer device. This is not limited in this embodiment of this application. The apparatus 1200 is a server. For example, the apparatus 1200 may be a SCS/AS. As shown in FIG. 12, the apparatus 1200 includes: a transceiver module 1210, configured to send first time information to a service capability exposure function entity, where the first time information is used to indicate a group message delivery stop time; and a processing module 1220, configured to deliver a group message before the group message delivery stop time.

Optionally, the transceiver module 1210 is further configured to send a first group message delivery complete indication to the service capability exposure function entity. The first group message delivery complete indication is used to indicate that the server has completed delivering the group message.

Optionally, the transceiver module 1210 is further configured to send second time information to the service capability exposure function entity. The second time information includes a preset time period. The preset time period is used to determine, when the service capability exposure function entity does not receive, within the preset time period, data sent by the server, that the server stops delivering the group message.

Optionally, the transceiver module 1210 is further configured to receive a second group message delivery complete indication sent by the service capability exposure function entity. The second group message delivery complete indication is used to indicate that the service capability exposure function entity has completed delivering the group message.

Optionally, the transceiver module 1210 is further configured to receive third time information from the service capability exposure function entity. The third time information is used to indicate an adjusted group message delivery stop time.

Correspondingly, that the processing module 1220 is configured to deliver the group message before the group message delivery stop time specifically includes: delivering the group message before the adjusted group message delivery stop time.

Optionally, that the transceiver module 1210 is configured to send the first time information to the service capability exposure function entity specifically includes: sending the first time information to the service capability exposure function entity by using a group message delivery request or by a group message delivery modification request.

It should be understood that the message transmission apparatus 1200 according to this embodiment of this application may correspondingly execute the methods of the server in the method embodiments, for example, the methods in FIG. 5 to FIG. 7. In addition, the foregoing and other management operations and/or functions of the modules in the apparatus 1200 are respectively used to implement corresponding steps of the methods of the server in the method embodiments. Therefore, beneficial effects in the method embodiments may also be achieved. For brevity, details are not described herein again.

The message transmission apparatus 1200 may further perform a message transmission method according to another embodiment of this application. Details are as follows: the transceiver module 1210 is configured to receive first time information from a service capability exposure function entity, where the first time information is used to indicate a group message delivery stop time; and the processing module 1220 is configured to deliver a group message before the group message delivery stop time.

Optionally, the transceiver module 1210 is further configured to send second time information to the service capability exposure function entity. The second time information includes a preset time period.

Optionally, the transceiver module 1210 is further configured to send a first group message delivery complete indication to the service capability exposure function entity. The first group message delivery complete indication indicates that the server has completed delivering the group message.

Optionally, the transceiver module 1210 is further configured to receive a second group message delivery complete indication sent by the service capability exposure function entity. The second group message delivery complete indication is used to indicate that the service capability exposure function entity has completed delivering the group message.

Optionally, the transceiver module 1210 is further configured to send an adjustment instruction to the service capability exposure function entity. The adjustment instruction is used to adjust the group delivery message stop time.

It should be understood that the message transmission apparatus 1200 according to this embodiment of this application may correspondingly execute the methods of the server in the method embodiments, for example, the methods in FIG. 8 to FIG. 10. In addition, the foregoing and other management operations and/or functions of the modules in the apparatus 1200 are respectively used to implement corresponding steps of the methods of the server in the method embodiments. Therefore, beneficial effects in the method embodiments may also be achieved. For brevity, details are not described herein again.

It should further be understood that in this embodiment, the apparatus 1200 is presented in a form of a functional module. The "module" herein may be an application-specific integrated circuit ASIC, a circuit, a processor and a memory that execute one or more software or firmware programs, an integrated logic circuit, and/or another component that may provide the foregoing functions. In a simple embodiment, a person skilled in the art may figure out that the apparatus 1200 may be in a form shown in FIG. 4. The processing module 1220 may be implemented by the processor 401 and the memory 402 shown in FIG. 4. The transceiver module 1210 may be implemented by the transceiver 403 shown in FIG. 4. Specifically, a processor is implemented by executing a computer program stored in a memory. Optionally, when the apparatus 1200 is a chip, a function and/or an implementation process of the transceiver module 1220 may alternatively be implemented by a pin, a circuit, or the like. Optionally, the memory is a storage unit in the chip, for example, a register or a cache. The storage unit may alternatively be a storage unit, such as the memory 402 shown in FIG. 4, that is in the computer device and that is located outside the chip.

Figure 13:
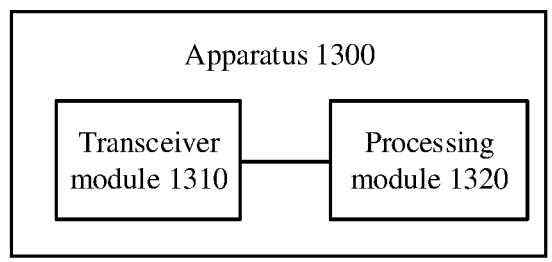
FIG. 13 is a schematic block diagram of a message transmission apparatus according to still another embodiment of this application.

FIG. 13 is a schematic block diagram of a message transmission apparatus 1300 according to an embodiment of this application. Optionally, a specific form of the apparatus 1300 may be a general-purpose computer device or a chip in the general-purpose computer device. This is not limited in this embodiment of this application. The apparatus 1300 is a server. For example, the apparatus 1300 may be a BM-SC. As shown in FIG. 13, the apparatus 1300 includes: a transceiver module 1310, configured to receive a bearer release time sent by a service capability exposure function entity; and a processing module 1320, configured to release a bearer based on the bearer release time.

Optionally, the processing module 1320 is further configured to adjust the bearer release time to obtain an adjusted bearer release time.

Correspondingly, the transceiver module 1310 is configured to send the adjusted bearer release time to the service capability exposure function entity.

Optionally, the transceiver module 1310 is further configured to receive a session termination request sent by the service capability exposure function entity.

It should be understood that the message transmission apparatus 1300 according to this embodiment of this application may correspondingly execute the methods of the broadcast/multicast service center in the method embodiments, for example, the methods in FIG. 5 to FIG. 7. In addition, the foregoing and other management operations and/or functions of the modules in the apparatus 1300 are respectively used to implement corresponding steps of the methods of the broadcast/multicast service center in the method embodiments. Therefore, beneficial effects in the method embodiments may also be achieved. For brevity, details are not described herein again.

It should further be understood that in this embodiment, the apparatus 1300 is presented in a form of a functional module. The "module" herein may be an application-specific integrated circuit ASIC, a circuit, a processor and a memory that execute one or more software or firmware programs, an integrated logic circuit, and/or another component that may provide the foregoing functions. In a simple embodiment, a person skilled in the art may figure out that the apparatus 1300 may be in a form shown in FIG. 4. The processing module 1320 may be implemented by the processor 401 and the memory 402 shown in FIG. 4. The transceiver module 1310 may be implemented by the transceiver 403 shown in FIG. 4. Specifically, a processor is implemented by executing a computer program stored in a memory. Optionally, when the apparatus 1300 is a chip, a function and/or an implementation process of the transceiver module 1320 may alternatively be implemented by a pin, a circuit, or the like. Optionally, the memory is a storage unit in the chip, for example, a register or a cache. The storage unit may alternatively be a storage unit, such as the memory 402 shown in FIG. 4, that is in the computer device and that is located outside the chip.

It should further be understood that numbers "first", "second", and the like in the embodiments of this application are merely used to distinguish between different objects, for example, distinguish between different pieces of "time information", and do not constitute a limitation on the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that the implementation goes beyond the scope of this application.

It may be clearly understood by a person skilled in the art that, for convenience and brevity of description, for a specific working process of the foregoing system, apparatus, and units, refer to a corresponding process in the foregoing method embodiments. Details are not described herein again.

In the several embodiments provided in this application, it should be understood that the disclosed system, apparatus, and method may be implemented in another manner. For example, the described apparatus embodiments are merely examples. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on an actual requirement to achieve an objective of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The storage medium includes any medium that may store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   receiving, by a service capability exposure function entity, first time information from a server, wherein the first time information indicates a group message delivery stop time; and
   determining, by the service capability exposure function entity, a bearer release time based on the first time information, and sending the bearer release time to a broadcast/multicast service center.

2. The method according to claim 1, wherein:
   the bearer release time is the same as the group message delivery stop time; or
   the bearer release time is later than the group message delivery stop time.

3. The method according to claim 1, further comprising:
   in response to receiving a first group message delivery complete indication from the server, and completing delivering a group message, sending, by the service capability exposure function entity, a second group message delivery complete indication to the server, wherein the first group message delivery complete indication indicates that the server has completed delivering the group message, and the second group message delivery complete indication indicates that the service capability exposure function entity has completed delivering the group message.

4. The method according to claim 1, further comprising:
receiving, by the service capability exposure function entity, second time information from the server, wherein the second time information indicates a preset time period; and
in response to the service capability exposure function entity not receiving, within the preset time period, data sent by the server, sending, by the service capability exposure function entity, a second group message delivery complete indication to the server.

5. The method according to claim 1, further comprising:
receiving, by the service capability exposure function entity, an adjusted bearer release time sent by the broadcast/multicast service center;
determining, by the service capability exposure function entity, third time information based on the adjusted bearer release time, wherein the third time information indicates an adjusted group message delivery stop time; and
sending, by the service capability exposure function entity, the third time information to the server.

6. The method according to claim 5, wherein:
the adjusted group message delivery stop time is the same as the adjusted bearer release time; or
the adjusted group message delivery stop time is earlier than the adjusted bearer release time.

7. The method according to claim 1, wherein receiving, by the service capability exposure function entity, the first time information provided by the server, comprises:
receiving, by the service capability exposure function entity, the first time information that is sent by the server using a group message delivery request or a group message delivery modification request.

8. The method according to claim 1, further comprising:
sending, by the service capability exposure function entity, a session creation request to the broadcast/multicast service center; and
sending, by the service capability exposure function entity, a session termination request to the broadcast/multicast service center at or after a time indicated by the first time information.

9. The method according to claim 1, further comprising:
sending, by the server, the first time information to the service capability exposure function entity; and
delivering, by the server, a group message before the group message delivery stop time.

10. The method according to claim 9, further comprising:
sending, by the server, a first group message delivery complete indication to the service capability exposure function entity, wherein the first group message delivery complete indication indicates that the server has completed delivering the group message.

11. The method according to claim 9, further comprising:
sending, by the server, second time information to the service capability exposure function entity, wherein the second time information comprises a preset time period, and the preset time period is usable to determine, in response to the service capability exposure function entity not receiving, within the preset time period, data sent by the server, that the server has stopped delivering the group message.

12. The method according to claim 9, further comprising:
receiving, by the server, a second group message delivery complete indication sent by the service capability exposure function entity, wherein the second group message delivery complete indication indicates that the service capability exposure function entity has completed delivering the group message.

13. The method according to claim 9, further comprising:
receiving, by the server, third time information from the service capability exposure function entity, wherein the third time information indicates an adjusted group message delivery stop time; and
delivering, by the server, the group message before the group message delivery stop time comprises:
delivering, by the server, the group message before the adjusted group message delivery stop time.

14. An apparatus, wherein the apparatus is a service capability exposure function entity, and the apparatus comprises a processor and a memory, wherein the processor is configured to run one or more instructions stored in the memory to:
receive first time information from a server, wherein the first time information indicates a group message delivery stop time; and
determine a bearer release time based on the first time information, and send the bearer release time to a broadcast/multicast service center.

15. The apparatus according to claim 14, wherein the processor is configured to further run one or more instructions stored in the memory to:
in response to receiving a first group message delivery complete indication from the server, and the apparatus completing delivering a group message, send a second group message delivery complete indication to the server, wherein the first group message delivery complete indication indicates that the server has completed delivering the group message, and the second group message delivery complete indication indicates that the service capability exposure function entity has completed delivering the group message.

16. The apparatus according to claim 14, wherein the processor is configured to further run one or more instructions stored in the memory to:
receive second time information from the server, wherein the second time information indicates a preset time period; and
in response to not receiving, within the preset time period, data sent by the server, send a second group message delivery complete indication to the server.

17. The apparatus according to claim 14, wherein the processor is configured to further run one or more instructions stored in the memory to:
receive an adjusted bearer release time sent by the broadcast/multicast service center;
determine third time information based on the adjusted bearer release time, wherein the third time information indicates an adjusted group message delivery stop time; and
send the third time information to the server.

18. The apparatus according to claim 14, wherein:
the bearer release time is the same as the group message delivery stop time; or
the bearer release time is later than the group message delivery stop time.

19. A system, comprising:
a server, configured to:
send first time information to a service capability exposure function entity, wherein the first time information indicates a group message delivery stop time; and deliver a group message before the group message delivery stop time; and the service capability exposure function entity, configured to:

receive the first time information from the server; and determine a bearer release time based on the first time information, and send the bearer release time to a broadcast/multicast service center.

20. The system according to claim 19, wherein:

the bearer release time is the same as the group message delivery stop time; or the bearer release time is later than the group message delivery stop time.

* * * * *